(12) United States Patent
Ikuta et al.

(10) Patent No.: US 7,175,916 B2
(45) Date of Patent: Feb. 13, 2007

(54) COMPOSITE MATERIAL AND METHOD FOR PREPARATION THEREOF

(75) Inventors: Toru Ikuta, Kobe (JP); Hajime Komada, Himeji (JP); Mitsuteru Mutsuda, Himeji (JP)

(73) Assignee: Daicel-Degussa Ltd., Tokyo (JP)

( * ) Notice: Subject to any disclaimer, the term of this patent is extended or adjusted under 35 U.S.C. 154(b) by 0 days.

(21) Appl. No.: 10/221,680

(22) PCT Filed: Jan. 9, 2002

(86) PCT No.: PCT/JP02/00021

§ 371 (c)(1), (2), (4) Date: Sep. 13, 2002

(87) PCT Pub. No.: WO02/055296

PCT Pub. Date: Jul. 18, 2002

(65) Prior Publication Data

US 2003/0118839 A1  Jun. 26, 2003

(30) Foreign Application Priority Data

Jan. 15, 2001  (JP) ............................ 2001-006767

(51) Int. Cl.
*B32B 25/08* (2006.01)

(52) U.S. Cl. ............... 428/476.9; 428/413; 428/423.3; 428/423.5; 428/423.7; 428/423.9; 428/424.4; 428/424.6; 428/424.8; 428/425.3; 428/474.7; 428/474.9; 428/475.2; 428/475.5; 428/475.8; 428/476.1; 428/476.3; 428/477.4; 428/480; 428/483; 428/492; 428/494; 428/501; 428/502; 428/504; 428/521; 428/522; 428/523

(58) Field of Classification Search ............. 428/474.4, 428/475.5, 476.1
See application file for complete search history.

(56) References Cited

U.S. PATENT DOCUMENTS

| | | | |
|---|---|---|---|
| 3,899,378 A * | 8/1975 | Wragg et al. ............... | 156/73.5 |
| 4,559,688 A | 12/1985 | Abu-Isa et al. ............ | 29/157.3 |
| 4,666,782 A * | 5/1987 | Tada et al. ................ | 428/423.9 |
| 4,921,762 A * | 5/1990 | Jadamus et al. ............ | 428/521 |
| 4,987,017 A * | 1/1991 | Sato et al. ................. | 428/36.8 |
| 5,102,489 A * | 4/1992 | Grosse-Puppendahl et al. ....................... | 156/307.1 |
| 5,378,543 A | 1/1995 | Murata et al. .............. | 428/517 |
| 5,462,091 A * | 10/1995 | Saupe ........................ | 138/126 |
| 5,552,460 A * | 9/1996 | Schmidt et al. ............. | 523/522 |
| 5,626,930 A | 5/1997 | Fukushi ..................... | 428/36.9 |
| 5,637,407 A * | 6/1997 | Hert et al. ................. | 428/474.7 |
| 5,962,146 A * | 10/1999 | Betremieux et al. ..... | 428/476.9 |
| 6,057,044 A * | 5/2000 | Rennar et al. .............. | 428/500 |
| 6,162,385 A * | 12/2000 | Grosse-Puppendahl et al. ......................... | 264/250 |
| 6,376,036 B1 * | 4/2002 | Nadkarni et al. .......... | 428/36.2 |
| 6,706,385 B1 * | 3/2004 | Karaiwa .................... | 428/323 |
| 6,800,372 B2 * | 10/2004 | Ikuta et al. ................ | 428/447 |

FOREIGN PATENT DOCUMENTS

| | | |
|---|---|---|
| EP | 0 788 875 A1 | 8/1997 |
| EP | 0 879 843 A1 | 11/1998 |
| EP | 1 041 103 A2 | 10/2000 |
| GB | 1 504 438 A | 3/1978 |
| JP | 49-28683 A | 3/1974 |
| JP | 50-25682 A | 3/1975 |
| JP | 61-204260 A | 9/1986 |
| JP | 01-149854 | 6/1989 |
| JP | 2-150439 A | 6/1990 |
| JP | 3-133631 A | 6/1991 |
| JP | 3-138114 A | 6/1991 |
| JP | 05170935 A * | 7/1993 |
| JP | 5-301973 A | 11/1993 |
| JP | 05301973 A * | 11/1993 |
| JP | 5-329984 A | 12/1993 |
| JP | 7-11013 A | 1/1995 |
| JP | 7-166043 A | 6/1995 |
| JP | 7-304880 A | 11/1995 |
| JP | 8-156188 A | 6/1996 |
| JP | 8-244068 A | 9/1996 |

(Continued)

*Primary Examiner*—Robert Sellers
(74) *Attorney, Agent, or Firm*—Birch, Stewart, Kolasch & Birch, LLP

(57) ABSTRACT

A composite of a resin member bonded to a vulcanized rubber member is obtained with using a rubber member vulcanized with a radical-generating agent (e.g., an organic peroxide) and a thermoplastic resin having at least 2 atoms, on average, selected from H and S atom per molecule, each atom having not less than 0.006 of an orbital interaction energy coefficient S represented by the following formula (1):

$$S=(C_{HOMO,n})^2/|E_c-E_{HOMO,n}|+(C_{LUMO,n})^2/|E_c-E_{LUMO,n}| \quad (1)$$

wherein $E_c$: an orbital energy (eV) of a radical, $C_{HOMO,n}$: a molecular-orbital coefficient of a highest occupied molecular orbital (HOMO) of an n-th H or S atom constituting a basic unit of the resin, $E_{HOMO,n}$: an orbital energy (eV) of the HOMO, $C_{LUMO,n}$: a molecular-orbital coefficient of a lowest unoccupied molecular orbital (LUMO) of the n-th H or S atom constituting the basic unit of the resin, $E_{LUMO,n}$: an orbital energy (eV) of the LUMO, and above all represent a value calculated by a semiempirical molecular orbital method MOPACPM3. The thermoplastic resin includes a polyamide, a polyester, a PPE, a POM, a PPS, a polyolefinic resins, and the unvulcanized rubber may comprise a vulcanization-activating having plural polymerizable unsaturated bonds. The invention gives the composite of the resin bonded directly to the rubber firmly without adhesives in wide combinations of the resin and the rubber.

10 Claims, No Drawings

FOREIGN PATENT DOCUMENTS

| | | | |
|---|---|---|---|
| JP | 08244068 A | * | 9/1996 |
| JP | 9-124803 A | | 5/1997 |
| JP | 9-216314 A | | 8/1997 |
| JP | 09216314 A | * | 8/1997 |
| JP | 10-58605 A | | 3/1998 |
| JP | 10-86282 A | | 4/1998 |

* cited by examiner

COMPOSITE MATERIAL AND METHOD FOR PREPARATION THEREOF

This application is the national phase under 35 U.S.C. § 371 of PCT International Application No. PCT/JP02/00021 which has an International filing date of Jan. 9, 2002, which designated the United States of America.

TECHNICAL FIELD

The present invention relates to a composite (or a composite member) of a thermoplastic resin bonded to a rubber integrally which is useful for a mechanical part or a machine element, an automobile part and so on, and relates to a process for producing the same.

BACKGROUND ART

An adhering method for adhering a resin molded article to a rubber molded article by an adhesive is known as a process of integrally joining a resin molded element to a rubber molded element. However, the process using the adhesives not only complicates the process to cause a troublesome process-control with resulting in costly but also does not necessarily give a sufficient adhesive strength.

Meanwhile, a composite of a resin directly bonded to a rubber has been proposed. For example, Japanese Patent Application Laid-open No. 25682/1975 (JP-50-25682A) discloses a process for producing a rubber-plastic composite, which comprises rubbing a thermoplastic plastic component (e.g., a polyformaldehyde and an olefinic polymer) and a vulcanized rubber component (e.g., polybutadiene, nitrile) compatible with the thermoplastic plastic component with contacting each other to melt or fuse the surface of the plastic, and solidifying the melted surface of the resin with contacting the thermoplastic resin component and the vulcanized rubber component. However, in the process, since a configuration of the bonding site or position in the composite is restricted, it is difficult to produce a composite of a thermoplastic resin molded article and a rubber molded article, each having a complicated configuration on a bonding site, and to increase the productivity of the composite.

Regarding to a polyphenylene ether-rubber composite, Japanese Patent Application Laid-open No. 204260/1986 (JP-61-204260A) discloses a process for producing a composite, which comprises heating a polyphenylene ether-series resin which may have a styrenic polymer and/or an additive together with a synthetic rubber comprising SBR, BR, IR, IIR or the like in the presence of the vulcanizing system. The literature also discloses that a double bond-containing rubber vulcanizable by sulfur is suitable as the rubber component, and that a sulfur-containing compound is used as a vulcanization-activating agent. Further, a comparative example (Table 2) of the literature discloses an example using a rubber composition comprising E-SBR or BR as the rubber component and a peroxide-containing vulcanizing agent or a sulfur-containing vulcanizing agent.

With respect to an ABS resin-rubber composite, Japanese Patent Application Laid-open No. 301973/1993 (JP-5-301973A) discloses a process for producing a composite, which comprises laminating an ABS resin molded member and an unvulcanized-rubber sheet composed of a rubber component having a critical surface tension of 37 to 39 mN/m, and subsequently heating the laminated sheet for adhering integrally. Japanese Patent Application Laid-open No. 124803/1997 (JP-9-124803A) discloses a process for producing a composite member, which comprises heating an acrylonitrile-containing thermoplastic resin (e.g., AS resin, ABS resin) with an acrylonitrile-containing rubber with intimately contacting each other. However, these processes markedly restrict species of resins and rubbers for combination because the adhesion depends on a compatibility between the thermoplastic resin and the rubber, and therefore the practical applications are much limited.

Referring to a polyamide-rubber composite, Japanese Patent Application Laid-open No. 150439/1990 (JP-2-150439A), Japanese Patent Application Laid-open No. 133631/1991 (JP-3-133631A) and Japanese Patent Application Laid-open No. 138114/1991 (JP-3-138114A) disclose a process for producing a polyamide-rubber composite, which comprises vulcanizing or crosslinking a rubber component with contacting a polyamide-series resin in the presence of the vulcanizing agent, wherein the rubber component comprises a carboxyl group- or an acid anhydride group-containing rubber, a peroxide, a vulcanization-activating agent (e.g., ethylene glycol dimethacrylate, triallyl isocyanurate), and an alkoxysilane compound. In these documents, a polyamide-series resin containing the larger number of a terminal amino group than that of a terminal carboxyl group is used as an aliphatic polyamide-series resin. Since these processes utilize a reaction between an amino group and a carboxyl group or an acid anhydride group, a combination of species of resins and rubbers is markedly restricted, and therefore it is difficult to obtain a resin/rubber composite in a wide combination of the resin and the rubber.

Japanese Patent Application Laid-open No. 11013/1995 (JP-7-11013A) discloses a process for producing a composite member of a vulcanized rubber firmly bonded to a polyamide, which comprises vulcanizing or crosslinking a rubber compound composed of a peroxide-containing vulcanizing agent and a silane compound with contacting a polyamide molded article. The literature discloses that the rubber compound may contain, if necessary, a vulcanization-activating agent, and also discloses that, in a comparative example (Table 2), even if an EPDM rubber comprising a peroxide (perkadox 14/40) and butanediol dimethacrylate (BDMA) was vulcanized in contact with a polyamide-series resin, a bonding between the resin and the rubber was not effected. Therefore, the composite member is hardly produced without an expensive silane compound.

Japanese Patent Application Laid-open No. 156188/1996 (JP-8-156188A) discloses a process for producing a composite member, which comprises vulcanizing or crosslinking a carboxyl group- or an acid anhydride group-containing rubber member with contacting closely an epoxy group-containing resin member. However, since this process also uses a reaction between the epoxy group and the carboxyl group, a combined species of the resin and the rubber is markedly limited, and it is difficult to obtain composites widely.

Regarding a process for producing a polyester-rubber composite comprising a thermoplastic polyester as a hard component and a vulcanized rubber as a soft component, Japanese Patent Application Laid-open No. 304880/1995 (JP-7-304880A) discloses a use of a rubber component comprising a rubber, a peroxide vulcanizing agent, a di- or poly-functional maleimide, and, if necessary, a vulcanization-activating agent, and Japanese Patent Application Laid-open No. 166043/1995 (JP-7-166043A) proposes to use a rubber component comprising a rubber, a peroxide vulcanizing agent, a silane compound, and, if necessary, a vulcanization-activating agent. Further, concerning a composite film or sheet comprising a resin film and a rubber film, Japanese Patent Application Laid-open No. 58605/1998

(JP-10-58605A) discloses a process for producing a composite film by laminating a rubber film (e.g., silicone rubber, ethylene-propylene-series rubber) comprising a polyfunctional methacrylate as an adhesion-improving agent on a substrate film (e.g., a polyester film), and vulcanizing or crosslinking the laminate. However, such processes cause difficulty for bonding the polyester film to the rubber film with a high adhesive strength.

Thus, conventional techniques require trial and error investigation for obtaining a high adhesive strength in a combination of a thermoplastic resin and a rubber, and it is difficult to obtain generally or universally a combination of a thermoplastic resin with a rubber to firmly bond each other.

It is, therefore, an object of the present invention to provide a composite of a resin bonded directly to a rubber firmly without an adhesive in a wide extent of combinations of a resin and a rubber, and a process for producing the same.

Another object of the invention is to provide a composite excellent in an adhesive strength between a resin and a rubber, and a process for producing the same.

DISCLOSURE OF INVENTION

The inventors of the present invention did intensive research, and finally found that a hydrogen atom and a sulfur atom are highly active to a radical-generating agent, each atom having a specific orbital interaction energy coefficient according to a molecular orbital method, and it is possible that a resin bonds directly to a rubber generally or universally by means of a combination of a thermoplastic resin having plural highly active hydrogen or sulfur atoms per molecule and an unvulcanized rubber comprising a radical-generating agent accompanied with vulcanizing or crosslinking the unvulcanized rubber in a wide extent of combinations of the resin and the rubber.

That is, the composite of the present invention is a composite comprising a vulcanized rubber member obtained by a vulcanization of an unvulcanized rubber and a resin member comprising a thermoplastic resin and bonded directly to the rubber member, which comprises a combination of a rubber member vulcanized with a radical-generating agent and a resin member comprising a thermoplastic resin having at least 2 atoms, on average, selected from a hydrogen atom and a sulfur atom per molecule, and each atom has an orbital interaction energy coefficient S of not less than 0.006, wherein the orbital interaction energy coefficient S is represented by the following formula (1):

$$S = \sum_n |(C_{HOMO,n})^2 / E_c - E_{HOMO,n}| + (C_{LUMO,n})^2 / E_c - E_{LUMO,n}| \quad (1)$$

wherein each of $E_c$, $C_{HOMO,n}$, $E_{HOMO,n}$, $C_{LUMO,n}$, and $E_{LUMO,n}$ represents a value calculated by a semiempirical molecular orbital method MOPACPM3, $E_c$ representing an orbital energy (eV) of a radical of the radical-generating agent, $C_{HOMO,n}$ representing a molecular-orbital coefficient of a highest occupied molecular orbital (HOMO) of an n-th hydrogen or sulfur atom constituting a constitutive unit of the thermoplastic resin, $E_{HOMO,n}$ representing an orbital energy (eV) of the HOMO, $C_{LUMO,n}$ representing a molecular-orbital coefficient of a lowest unoccupied molecular orbital (LUMO) of the n-th hydrogen or sulfur atom constituting the constitutive unit of the thermoplastic resin, and $E_{LUMO,n}$ representing an orbital energy (eV) of the LUMO.

Said combination excludes or is substantially free from the following combinations (1) to (3); (1) a combination of an aliphatic polyamide-series resin having an amino group and an unvulcanized rubber having a carboxyl group or an acid anhydride group, (2) a combination of an aliphatic polyamide-series resin and an unvulcanized rubber comprising a silane compound, and (3) a combination of an epoxy group-containing resin and an unvulcanized rubber having a carboxyl group or an acid anhydride group. Further, said combination includes the following cases (4) and (5); (4) when the thermoplastic resin comprises a polyamide-series resin, the unvulcanized rubber comprises a polyfunctional vulcanization-activating agent, and (5) when the thermoplastic resin comprises a polyphenylene ether-series resin, the unvulcanized rubber comprises a vulcanization-activating agent.

The thermoplastic resin includes various resins, for example, a polyamide-series resin, a polyester-series resin, a polyether-series resin, a polyolefinic resin, a polyurethane-series resin, and a thermoplastic elastomer. The rubber includes various rubbers such as a diene-series rubber, an olefinic rubber, an acrylic rubber, a fluorine-containing rubber, and a urethane-series rubber. The radical-generating agent includes, for example, an organic peroxide, an azo compound, and a sulfur-containing organic compound. At least one component selected from the unvulcanized rubber and the thermoplastic resin may comprise a vulcanization-activating agent (e.g., an organic compound having at least two polymerizable-unsaturated bonds per molecule), and the thermoplastic resin may comprise a vulcanizing auxiliary (e.g., a compound having at least 2 hydrogen atoms on average per molecule in which hydrogen atoms each has an orbital interaction energy coefficient S of not less than 0.006).

In the process of the present invention, the composite of a resin member comprising a thermoplastic resin bonded to a rubber member comprising a vulcanized rubber is produced with use of a combination of the above mentioned thermoplastic resin and an unvulcanized rubber comprising a radical-generating agent. The process may comprises molding a resin molding element or material and a rubber molding element or material with contacting said elements or materials each other, and vulcanizing or crosslinking the rubber molding element to produce a composite of a resin member bonded to a rubber member, wherein said resin molding element or material is either of a resin composition and a resin member, each comprising the thermoplastic resin, and said rubber molding element or material is either of a rubber composition and a rubber premolded article, each comprising at least an unvulcanized rubber and a radical-generating agent being active on a surface to be contacted with said molding resin member or element. The vulcanization-activating agent may be incorporated into at least one component selected from the unvulcanized rubber and the thermoplastic resin, and the thermoplastic resin may comprise the vulcanizing auxiliary.

Moreover, the production process of the present invention also includes a process which comprises heat-molding the resin molding element or material and the rubber molding element or material with interposing a vulcanization-activating agent (and a coating agent comprising the vulcanizing auxiliary) on an interface between the resin molding element or material and the rubber molding element or material to produce a composite comprising the resin member and the rubber member bonded to the resin member.

Further, the process of the present invention includes a process for producing a composite comprising a resin member comprising the thermoplastic resin and a vulcanized rubber member bonded to the resin member, which comprises heat-molding the resin member and the vulcanized rubber member with interposing a vulcanization-activating agent (and a coating agent comprising the vulcanizing auxiliary) on an interface between the resin member and the vulcanized rubber member. In this process, a combination of the resin and the rubber is not restricted in a combination of the resin member obtained from a resin composition comprising the thermoplastic resin and the vulcanized rubber member obtained from an unvulcanized rubber composition comprising an unvulcanized rubber and a radical-generating agent, and various combinations of the resin and the rubber may be used. The composite of the resin member bonded to the vulcanized rubber member may be produced by treating (coat-treating) a surface of the resin member with a solvent capable of dissolving or swelling the resin member, and contacting the treated surface with the unvulcanized rubber composition. In this process, even if a solvent is removed from the solvent-treated resin member, the firmly bonding of the vulcanized rubber member to the resin member can be realized by contacting the treated surface of the resin member with the unvulcanized rubber composition.

DETAILED DESCRIPTION OF THE INVENTION

[Resin Member]

As the thermoplastic resin constituting a resin member, a resin having a plurality of hydrogen atom (an active hydrogen atom) or sulfur atom (an active sulfur atom) can be selected, and each atom is highly active to a radical-generating agent (hereinafter, the hydrogen atom and the sulfur atom may be referred to as an active atom). That is, the thermoplastic resin can be selected depending on species of the radical-generating agent, and contains for example, an active atom having an orbital interaction energy coefficient S represented by the following formula (1) of not less than the given value (e.g., 0.006, and preferably 0.008). The preferred value of the orbital interaction energy coefficient S of the active atom is about 0.006 to 0.06, and preferably about 0.007 to 0.05 (particularly about 0.01 to 0.045). The number of the active atom in the resin depends on a bonding position or site of a functional group having the active atom (e.g., an end or terminal, a branched chain, or a main chain), and may be, for example, not less than 2 (about 2 to 10000), preferably not less than 2.5 (about 2.5 to 5000), and more preferably not less than 3 (about 3 to 1000) as an average per the thermoplastic resin molecule. The number of the active atom per the thermoplastic resin molecule is usually about 2 to 100 (preferably about 2.5 to 50, more preferably about 3 to 25, and particularly about 3 to 20). The selection of thermoplastic resin satisfied with such conditions progresses a crosslinking reaction on an interface between a rubber component and a thermoplastic resin component in a vulcanization or curing of the rubber component to firmly or strongly bond each other.

$$S = (C_{HOMO,n})^2 / |E_c - E_{HOMO,n}| + (C_{LUMO,n})^2 / |E_c - E_{LUMO,n}| \quad (1)$$

wherein each of $E_c$, $C_{HOMO,n}$, $E_{HOMO,n}$, $C_{LUMO,n}$, and $E_{LUMO,n}$ represents a value calculated by the semiempirical molecular orbital method MOPACPM3, $E_c$ representing an orbital energy (eV) of a radical of the radical-generating agent, $C_{HOMO,n}$ representing a molecular-orbital coefficient of a highest occupied molecular orbital (HOMO) of an n-th hydrogen or sulfur atom constituting a constitutive unit of the thermoplastic resin; $E_{HOMO,n}$ representing an orbital energy (eV) of the HOMO; $C_{LUMO,n}$ representing a molecular-orbital coefficient of a lowest unoccupied molecular orbital (LUMO) of the n-th hydrogen or sulfur atom constituting the constitutive unit of the thermoplastic resin, and $E_{LUMO,n}$ representing an orbital energy (eV) of the LUMO.

MOPACPM3 represented by the formula (1) is one of molecular orbital (MO) methods. The molecular orbital method is one of approximations for discussing a molecular electron condition or state, and is classified into three main methods; an empirical method such as Huckel's rule, a semiempirical method enhancing an approximation of the Huckel's rule, and an nonempirical method determining strictly a molecular orbital function by only calculation. In recent years, with developing a computer system, the semiempirical method and the nonempirical method are main methods. The molecular orbital method is a most convincible method correlating a molecular structure and chemical reactivity thereof. For example, when searching the term "molecular orbital method" as a keyword in JST Online Information System (JOIS), about 53000 of a registered number can be found (term: 1980 to 2000 May). The MOPACPM3 is the core of NDDO (Neglect of Diatomic Differential Overlap) method which is one of the semiempirical methods.

The MOPACPM3 is used for mainly studying a reaction of an organic compound, and is explained in many literatures and publications [e.g., "Molecular orbital method MOPAC guidebook" (Tsuneo Hirano, Kazutoshi Tanabe; Kaibundo, 1991), "Quantum Chemistry, 3rd revised edition" (Teijiro Yonezawa et al., Kagaku Dojin, 1983), "Calculation Chemistry giudebook" (translated by Eiji Osawa et al., written by Tim Clark, Maruzen, 1985)].

A constitutive unit (or basic unit) in the formula (1) means a modeling molecular structure comprising a polymer terminal and about 1 to 3 repeating unit(s). That is, it is difficult to calculate a molecular orbital for a polymer compound itself by MOPACPM3, since the polymer compound has too much numbers of atoms per molecule. Therefore, a calculation may be carried out for a modeling molecular structure (a constitutive unit or basic unit) comprising a polymer terminal and about 2 to 3 repeating units. For example, a molecular structure (repeating unit) of polybutylene terephthalate (PBT) is generally represented by a chemical formula "—$(CH_2$—$CH_2$—$CH_2$—$CH_2$—O—C(=O)—$C_6H_4$—C(=O)—O)$_n$—", and the calculation of a molecular orbital in the formula (1) may be conducted for "HO—$CH_2$—$CH_2$—$CH_2$—$CH_2$—O—C(=O)—$C_6H_4$—C(=O)—OH" as a constitutive unit.

The orbital interaction energy coefficient S represented by the formula (1) may be referred to as a reactive index, and is defined and explained in various publications. When a chemical reactivity is discussed, the orbital interaction energy coefficient S is used as a parameter for the chemical reactivity in general. For example, "Introduction of Frontier orbital theory" (p.72, Shinichi Yamabe, Satoshi Inagaki, Kodansha Scientific, 1989) describes that an orbital interaction energy coefficient S indicates a concept "Regarding to an interaction between two orbits, (a) a smaller energy difference between two orbits and (b) a larger overlap between two orbits make the interaction stronger". The formula (1) is based upon an idea of superdelocalizability (Sr) published at 1954 by Dr. Fukui given a Nobel prize (see "To use a molecular orbital method", p. 71, Minoru Imoto, Kagaku Dojin, 1986), a formula similar to the formula (1) is reported from the concept of Sr on various publications and literatures.

Hereupon, it is important that the molecular orbital method is widely known in discussion of a molecular structure and chemical reactivity thereof. Therefore, an orbital interaction energy coefficient S (1/eV) defined by the following formula (1) does not represent a mere conceptual value, and represents a value meaning a parameter or properties of a material (e.g., a molecular weight, a functional group) for definition of the material.

The radical orbital energy $E_C$ (eV) of a radical-generating agent is preferably calculated based on a radical molecular structure with the use of MOPACPM3, and a predetermined value based on species of the radical-generating agent may be used for convenience. For example, the $E_C$ value of the radical-generating agent may be −8 eV for an organic peroxide, −5 eV for an azo compound, and −6 eV for a sulfur-containing organic compound excluding a sulfur.

As the hydrogen atom having a predetermined value (e.g., 0.006) or more of an orbital interaction energy coefficient S (an active hydrogen atom) in the case where the radical-generating agent comprises an organic peroxide, there may be mentioned, for example, a hydrogen atom constituting, an amino group ($-NH_2$) (e.g., a terminal amino group), an imino group ($-NH-$) (e.g., a main-chain or terminal imino group, $-NH-$ of an amide group), a mercapto group ($-SH$), a methyl group ($-CH_3$), a methylene group ($-CH_2-$) (a methylene group adjacent to an electron-withdrawing or -attracting group, i.e., an active methylene group), and a methylidyne group ($-CH=$) (a main-chain or terminal methylidyne group), etc.

As the sulfur atom having a given value (e.g., 0.006) or more of an orbital interaction energy coefficient S (an active sulfur atom) in the case where the radical-generating agent comprises an organic peroxide, there may be mentioned, for example, a sulfur atom constituting a thio group ($-S-$), a mercapto group ($-SH$), an alkylthio group (e.g., a $C_{1-4}$alkylthio group such as a methylthio group, an ethylthio group), a sulfinyl group ($-SO-$), etc.

The methyl group includes, for example, a methyl group bonding to an alkylene chain, a cycloalkylene chain, or an aromatic ring; a methyl group bonding to an oxygen atom (e.g., a methyl group in a methoxy group). The methylene group may include, for example, a methylene group adjacent to an oxygen atom constituting a (poly)oxyalkylene unit such as a (poly)oxymethylene unit and a (poly)oxyethylene unit, and a methylene group adjacent to a nitrogen atom constituting an amino group or an imino group. The methylidyne group includes, for example, an α-positioned methylidyne group adjacent to an amino group or an imino group, and a methylidyne group α-positioned to an amino group in an aminocycloalkyl group.

It is sufficient that a thermoplastic resin has plural (e.g., not less than 2) active atoms on average per molecule. That is, the thermoplastic resin is not usually constituted by a single molecule, and comprises a mixture of numerous molecules being partially different in a structure and a chain length. Therefore, all molecules of the thermoplastic resin are not required essentially to have a plurality of active atoms, and the number of an active atom on average per molecule is to be not less than 2 in calculating a plurality of predictable predominant constitutive or basic units. For example, the number of an active hydrogen atom constituting a polymer having a repeating unit $-(NH-(CH_2)_6-NH-C(=O)-(CH_2)_4-C(=O))_n-$ (polyamide 66) may be calculated based on a modeling constitutive unit $NH_2-(CH_2)_6-NH-C(=O)-(CH_2)_4-C(=O)-OH$, and when a radical-generating agent comprises an organic peroxide, an active hydrogen atom comprises 2 hydrogen atoms of a terminal $NH_2$ group (that is, S is not less than 0.006). In this case, an average number N of an active hydrogen atom per polyamide 66 molecule can be calculated with the use of the following formula (2) from a ratio of a terminal $NH_2$ group and a terminal COOH group in a polymer (polyamide 66) as an aggregate;

$$N = 2 \times A \qquad (2)$$

wherein A represents an average number of a terminal $NH_2$ group per molecule.

For example, in a ratio of a terminal $NH_2$ group/terminal COOH group=1/1 (molar ratio) in the resin, the number A of the terminal $NH_2$ group per molecule is 1, and the number N of the active hydrogen atom per molecule is equal to 2. Moreover, in 1/2 (molar ratio) of terminal $NH_2$ group/terminal COOH group, the number A of the terminal $NH_2$ group per molecule shows 2/3, and the number N of the active hydrogen atom per molecule is 4/3.

In the case where the thermoplastic resin is a resin mixture comprising plural resins different in the number of an active atom, the number of an active atom in the resin mixture may be represented by an average number of an active atom in each resin. That is, the number of an apparent active atom in the resin mixture can be estimated by calculating respectively an average number of an active atom for each resin based on a constitutive unit, and averaging the calculated number of the active atom according to a proportion (molar ratio) of the plural resins. For example, when the resin mixture comprises (A) the above mentioned polyamide 66 (N=2) and (B) the above mentioned polyamide 66 (N=4/3), and the ratio of (A)/(B) (molar ratio) is 1/1, an average active atom number N can be counted as 5/3. Moreover, when the resin mixture comprises (A) the above mentioned polyamide 66 (N=2) and (C) a polyamide 66 having carboxyl group as all terminal groups (N=0) and the ratio of (A)/(C) (molar ratio) is 3/1, an average active atom number N per molecule of the resin mixture can be counted as 3/2.

The thermoplastic resin is not particularly restricted as far as there are a plurality of active atoms per molecule, and includes various resins, for example, a polyamide-series resin, a polyester-series resin, a polyether-series resin (e.g., a polyacetal-series resin, a polyphenylene ether-series resin, a polysulfide-series resin), a polyolefinic resin, a polyurethane resin, a thermoplastic elastomer. Moreover, even when a resin does not have the plural active atoms mentioned above, the resin can be modified to a thermoplastic resin capable of firmly bonding to a rubber member by introducing an active atom into the resin. These thermoplastic resins can be used singly or in combination. In the case that two or more thermoplastic resins are used in combination, a resin composition may be a mixed- or compounded-resin composition such as a polymer alloy.

Incidentally, the molecular weight of the thermoplastic resin is not particularly restricted. Even if a polymer having the plural active atoms per molecule, a concentration of the active atom in the polymer relatively decreases with increasing a molecular weight of the polymer to cause a lower crosslinking rate or density between a resin and a rubber. As a result, contribution of the active atom relative to a bonding of the members deteriorates sometimes. Therefore, a resin having a low molecular weight is advantageous for bonding the members. In the present invention, a number-average molecular weight of a resin is usually about 3000 to 400000, preferably about 5000 to 100000, and more preferably about 5000 to 50000, for example, about 8000 to 20000.

(1) A polyamide-series Resin

As the polyamide-series resin, there may be mentioned an aliphatic polyamide-series resin, an alicyclic polyamide-series resin, and an aromatic polyamide-series resin, and the aliphatic polyamide-series resin is practically used. The aliphatic polyamide-series resin includes a condensed compound of an aliphatic diamine component (e.g., a $C_{4-10}$alkylene diamine such as tetramethylenediamine, hexamethylenediamine) and an aliphatic dicarboxylic acid (e.g., an alkylene dicarboxylic acid having about 4 to 20 carbon atoms such as adipic acid, sebacic acid and dodecanedioic acid), for example, polyamide 46, polyamide 66, polyamide 610, polyamide 612 and so on; a homopolymer or a copolymer of a lactam (e.g., a lactam having about 4 to 20 carbon atoms such as ε-caprolactam, ω-laurolactam) or an aminocarboxylic acid (e. g., an aminocarboxylic acid having about 4 to 20 carbon atoms such as ω-aminoundecanoic acid), for example, polyamide 6, polyamide 11, polyamide 12 and so on; a copolyamide copolymerizing these polyamide components (e.g., polyamide 6/11, polyamide 6/12, polyamide 66/11, polyamide 66/12) and the like.

As the alicyclic polyamide-series resin, there may be exemplified a polyamide in which an alicyclic diamine and/or an alicyclic dicarboxylic acid is used as at least part of the aliphatic diamine component and/or the aliphatic dicarboxylic acid. The alicyclic polyamide includes, for example, a condensed compound of the aliphatic dicarboxylic acid and an alicyclic diamine component [e.g., a $C_{5-8}$cycloalkyl diamine such as cyclohexyl diamine; a bis (aminocyclohexyl)alkane such as bis(aminocyclohexyl) methane and 2,2-bis(aminocyclohexyl)propane].

As the aromatic polyamide-series resin, there may be mentioned, a polyamide in which at least one component among the aliphatic diamine components and the aliphatic dicarboxylic acid components comprises an aromatic component, for example, a polyamide in which the diamine component comprises an aromatic component [e.g., a condensed compound of an aromatic diamine (e.g., meta-xylylenediamine) and an aliphatic dicarboxylic acid, such as MXD-6]; a polyamide in which the dicarboxylic acid component comprises an aromatic component [e.g., a condensate compound of an aliphatic diamine (e.g., trimethylhexamethylenediamine) and an aromatic dicarboxylic acid (e.g., terephthalic acid, isophthalic acid)]; a polyamide in which both the diamine component and the dicarboxylic acid component comprise an aromatic component [e.g., a fully aromatic amide such as a poly(m-phenyleneisophthalamide (e.g., Aramid$^{(R)}$)], and others.

The polyamide-series resin further includes a polyamide comprising a dimeric acid as the dicarboxylic acid component, a polyamide having a branched structure by introducing a small amount of a polyfunctional polyamine and/or a polycarboxylic acid component, and a modified polyamide (e.g., N-alkoxymethylpolyamide).

In the polyamide-series resin, an active hydrogen atom includes, for example, a hydrogen atom of a terminal amino group, a hydrogen atom bonding to an α-positioned carbon atom relative to a terminal amino group, a hydrogen atom bonding to a carbon atom adjacent to a group —NH— of an amide bond (e.g., a hydrogen atom of a methylene group, a hydrogen atom of a methylidyne group), in particular the hydrogen atom of the terminal amino group.

In the polyamide-series resin, the proportion of a terminal $NH_2$ group relative to a terminal COOH group is not particularly restricted, and may be, for example, selected from the range of about 10/90 to 100/0, preferably about 20/80 to 100/0, and more preferably about 25/75 to 100/0 as a molar ratio of terminal amino group/terminal carboxyl group, when the active hydrogen atom comprises a hydrogen atom of the terminal amino group and a hydrogen atom of the α-positioned carbon atom. Moreover, in the case where the active hydrogen atom comprises only hydrogen atoms of the terminal amino group, the ratio (molar ratio) of terminal amino group/terminal carboxyl group, may be about 50/50 to 100/0, preferably about 60/40 to 100/0, and more preferably about 70/30 to 100/0.

(2) A Polyester-series Resin

The polyester-series resin may be an aliphatic polyester-series resin, and is usually an aromatic polyester-series resin, for example, a polyalkylene arylate-series resin or a saturated aromatic polyester-series resin. The aromatic polyester-series resin includes, for example, a poly$C_{2-4}$alkylene terephthalate such as polyethylene terephthalate (PET) and polybutylene terephthalate (PBT); a poly$C_{2-4}$alkylene naphthalate corresponding to the polyalkylene terephthalate (e.g., polyethylene naphthalate); 1,4-cyclohexyldimethylene terephthalate (PCT). The polyester-series resin may be a copolyester comprising an alkylene arylate unit as a predominant or main component (e.g., not less than 50% by weight), and a copolymerizable component may be exemplified a $C_{2-6}$alkylene glycol such as ethylene glycol, propylene glycol, butanediol, and hexanediol; a polyoxy$C_{2-4}$alkylene glycol; an asymmetrical aromatic dicarboxylic acid or an acid anhydride thereof such as phthalic acid, isophthalic acid; and an aliphatic dicarboxylic acid such as adipic acid. Moreover, a branched structure may be introduced into a linear polyester by using or modifying with small amounts of polyol and/or polycarboxylic acid component.

In the case that the aromatic polyester-series resin has a lower concentration of the active atom relative to the predetermined concentration, a polyester-series resin modified with a modifying compound having the active atom (e.g., an aromatic polyester-series resin comprising at least one member selected from an amino group and an oxyalkylene group) may be used. As the compound having the active atom, particularly, an active hydrogen atom, there may be mentioned, for example, a polyamine [e.g., an aliphatic diamine such as a linear- or branched-alkylenediamine having about 2 to 10 carbon atoms, e.g., ethylenediamine, trimethylenediamine, propylenediamine, tetramethylene diamine, pentamethylenediamine, hexamethylenediamine, trimethylhexamethylenediamine, 1,7-diaminoheptane, and 1,8-diaminooctane; an alicyclic diamine such as isophorone diamine, bis(4-amino-3-methylcyclohexyl)methane, and bis (aminomethyl)cyclohexane; and an aromatic diamine such as phenylenediamine, xylylenediamine, and diaminodiphenylmethane]; and a polyol [e.g., a (poly)oxy$C_{2-4}$alkylene glycol such as a (poly)oxyethylene glycol, a (poly)oxytrimethylene glycol, a (poly)oxypropylene glycol, and a (poly) oxytetramethylene glycol]. The modification can be conducted by, for example, heating a mixture of a polyester resin and the modifying compound to cause an amidation, an esterification or an transesterification reaction. The degree of the modification of the polyester-series resin may depend on a concentration of the active hydrogen atom in the compound, and may be, for example, about 0.1 to 2 mol, preferably about 0.2 to 1.5 mol, and more preferably about 0.3 to 1 mol of the modified compound relative to 1 mol of a functional group (e.g., a hydroxyl group or a carboxyl group) of the polyester-series resin. In the transesterification reaction, the amount of the (poly)oxy$C_{2-4}$alkylene glycol may be about 1 to 50 parts by weight, and preferably about 5 to 30 parts by weight relative to 100 parts by weight of the polyester-series resin.

In the polyester-series resin, the active hydrogen atom usually comprises a hydrogen atom of methylene group adjacent to an oxygen atom of a (poly)oxyalkylene unit. In the modified polyester-series resin, an active hydrogen atom usually comprises a hydrogen atom of a terminal amino group, a hydrogen atom bonding to an α-positioned carbon atom relative to a terminal amino group, a hydrogen atom bonding to a carbon atom adjacent to a group —NH— of an amide bond (e.g., a hydrogen atom of a methylene group, a hydrogen atom of a methylidyne group), and particularly the hydrogen atom of the terminal amino group.

(3) A poly(thio)ether-series Resin

The poly(thio)ether-series resin includes a polyoxyalkylene-series resin, a polyphenylene ether-series resin, and a polysulfide-series resin (polythioether-series resin). As examples of the polyoxyalkylene-series resin, there may be mentioned a polyoxy$C_{1-4}$alkylene glycol such as a polyoxymethylene glycol, a polyoxyethylene glycol, a polyoxypropylene glycol, a polyoxyethylene-polyoxypropylene block-copolymer, and a polyoxytetramethylene glycol, and the like. Preferred examples of the polyether-series resin include a polyacetal-series resin, a polyphenylene ether-series resin, and a polysulfide-series resin.

(3a) A polyacetal-series Resin

The polyacetal-series resin may be a homopolymer (homopolymer of formaldehyde), or a copolymer (e.g., a copolymer of trioxane with ethylene oxide and/or 1,3-dioxolane). Moreover, an end or terminal of the polyacetal-series resin may be blocked or capped to stablized. In the polyacetal-series resin, an active hydrogen atom comprises, for example, a hydrogen atom of an oxymethylene unit, a hydrogen atom of an alkoxy group (particularly methoxy group) of a blocked terminal, and particularly the hydrogen atom of the oxymethylene unit.

(3b) A polyphenylene ether-series Resin

The polyphenylene ether-series resin includes various resins comprising 2,6-dimethylphenylene oxide as a main component, for example, a copolymer of 2,6-dimethylphenylene oxide and a phenol, a modified resin in which blending or being grafted with a styrenic resin, and so on. In the polyphenylene ether-series resin, for example, the active hydrogen atom comprises a hydrogen atom of a methyl group bonding to a benzene ring.

(3c) A polysulfide-series Resin (polythioether-series Resin)

The polysulfide-series resin is not particularly restricted to a specific resin so far as the resin has a thio group (—S—) in the polymer chain. Such a resin includes, for example, a polyphenylene sulfide resin, a polydisulfide resin, a polybiphenylene sulfide resin, a polyketone sulfide resin, a polythioether sulfone resin, and the like. Moreover, the polysulfide-series resin may have a substituent such as an amino group, including a poly(aminophenylene sulfide). The preferred polysulfide-series resin includes a polyphenylene sulfide resin. In the polysulfide-series resin, the active sulfur atom comprises a sulfur atom of a thio group in the main chain. For example, regarding the polyphenylene sulfide resin, an average number N of the active sulfur atom per molecule can be calculated based on a model of constitutive unit "Cl—$C_6H_4$—S—$C_6H_4$—S—$C_6H_4$—Cl", and the unit has N=2.

(4) A polyolefinic Resin

The polyolefinic resin includes, for example, a homopolymer or copolymer of an olefin such as a polyethylene, a polypropylene, an ethylene-propylene copolymer, a poly(methylpentene-1); a copolymer of an olefin and a copolymerizable monomer (e.g., an ethylene-vinyl acetate copolymer, an ethylene-(meth)acrylic acid copolymer, an ethylene-(meth)acrylate copolymer). These polyolefinic resins can be used singly or in combination.

Preferred examples of the polyolefinic resin includes a polypropylene-series resin having a propylene content of not less than 50% by weight (in particular, 75 to 100% by weight), for example, polypropylene, propylene-ethylene copolymer, propylene-butene copolymer, propylene-ethylene-butene copolymer, and so on. Moreover, the polyolefinic resin preferably has a crystallinity.

In the polyolefinic resin, an active hydrogen atom comprises, for example, a hydrogen atom in a methylene group constituting a main chain of a polyolefin, a hydrogen atom in a methyl group branched from the main chain.

(5) A polyurethane-series Resin

The polyurethane-series resin can be obtained by reacting a diisocyanate, a polyol and, if necessary, a chain-extension agent. As the diisocyanate, there are exemplified an aliphatic diisocyanate such as hexamethylene diisocyanate and 2,2,4-trimethylhexamethylene diisocyanate; an alicyclic diisocyanate such as 1,4-cyclohexane diisocyanate and isophorone diisocyanate; an aromatic diisocyanate such as a phenylene diisocyanate, a tolylene diisocyanate, and a diphenylmethane-4,4'-diisocyanate; an araliphatic diisocyanate such as a xylylene diisocyanate, and so on. The diisocyanate may be a compound having an alkyl group (e.g., methyl group) substituted on a main chain or a ring.

As a diol, there may be mentioned a polyester diol (e.g., a polyesterdiol derived from a $C_{4-12}$ aliphatic dicarboxylic acid component such as adipic acid; a $C_{2-12}$aliphatic diol component such as ethylene glycol, propylene glycol, butanediol, and neopentyl glycol; a $C_{4-12}$lactone component such as ε-caprolactone), a polyether diol (e.g., a polyethylene glycol, a polypropylene glycol, a polyoxyethylene-polyoxypropylene block-copolymer, a polyoxytetramethylene glycol, a bisphenol A-alkylene oxide adduct), a polyester ether diol (a polyester diol in which the polyether diol is used as part of the diol component).

As the chain-extension agent, a $C_{2-10}$alkylene diol such as ethylene glycol and propylene glycol as well as a diamine can be used. The diamine includes, for example, an aliphatic diamine such as a linear- or branched-alkylenediamine having about 2 to 10 carbon atoms (e.g., ethylenediamine, trimethylenediamine, tetramethylenediamine, pentamethylenediamine, hexamethylenediamine, trimethylhexamethylenediamine, 1,7-diaminoheptane, 1,8-diaminooctane) and a linear- or branched-polyalkylenepolyamine (e.g., diethylenetriamine, triethylenetetramine, tetraethylenepentamine, dipropylenetriamine); an alicyclic diamine such as isophoronediamine, bis(4-amino-3-methylcyclohexyl)methane, and bis(aminomethyl)cyclohexane; and an aromatic diamine such as phenylenediamine, xylylenediamine, and diaminodiphenylmethane.

In the polyurethane-series resin, an active hydrogen atom comprises, for example, a hydrogen atom of an alkyl group bonding to a main chain or a ring of the diisocyanate (particularly a hydrogen atom at a benzyl position), a hydrogen atom in an alkylene group of a polyol or a polyoxyalkylene glycol, a hydrogen atom in an amino group of the chain-extension agent, etc.

(6) A Thermoplastic Elastomer

The thermoplastic elastomer includes, for example, a polyamide-series elastomer (a copolymer comprising a polyamide as a hard segment and an aliphatic polyether as a soft segment), a polyester-series elastomer (a copolymer comprising a polyalkylene arylate as a hard segment and an aliphatic polyether or aliphatic polyester as a soft segment), a polyurethane-series elastomer (a copolymer comprising a polyurethane containing a short-chain glycol as a hard segment and an aliphatic polyether or an aliphatic polyester as a soft segment, for example, a polyester-urethane elastomer, a polyether-urethane elastomer, or the like), a polystyrenic elastomer (a copolymer comprising a polystyrenic block as a hard segment and a diene-polymer block or a hydrogenated thereof as a soft segment), a polyolefinic elastomer (e.g., a copolymer comprising a polystyrene or a polypropylene as a hard segment and an ethylene-propylene rubber or an ethylene-propylene-diene rubber as a soft segment; an olefinic elastomer comprising a hard segment and a soft segment which are different in crystallinity), a polyvinyl chloride-series elastomer, a fluorine-containing thermoplastic elastomer, and so on. As the aliphatic polyether, the (poly)oxyC$_{2-4}$alkylene glycol and the other (particularly, the polyoxyethylene glycol) mentioned in the items of the polyester-series resin and the polyurethane-series resin can be used. As the aliphatic polyester, the polyesterdiol and the other mentioned in the item the polyurethane-series resin can be used. These thermoplastic elastomers can be used singly or in combination.

When the thermoplastic elastomer is a block copolymer, a block structure is not particularly restricted, and may be a triblock structure, a multiblock structure, a star-shaped structure or another structure.

Preferred examples of the thermoplastic elastomer include polyamide-series elastomer, polyester-series elastomer, polyurethane-series elastomer, polystyrenic elastomer, and polyolefinic elastomer.

In the thermoplastic elastomer, an active hydrogen atom may comprise, for example, a hydrogen atom in an oxyalkylene unit of a soft segment.

(7) Another Thermoplastic Resin (Modified Resin)

The present invention applies to bonding or joining of a thermoplastic resin having a predetermined concentration of the active atom to a rubber. Therefore, when the thermoplastic resin has a lower concentration of the active atom relative to the given concentration, the thermoplastic resin may be used as a modified resin introducing the active atom (amino group, oxyalkylene group, mercapto group, and so on). Such a thermoplastic resin (a resin having less concentration of an active atom than the determined concentration) includes, for example, a vinyl polymerization-series resin [e.g., a (meth)acrylic resin (e.g., a poly(methyl methacrylate), a methyl methacrylate-styrene copolymer (MS resin)); a styrenic resin (e.g., a polystyrene; a styrenic copolymer such as a AS resin and a styrene-methyl methacrylate copolymer; a styrenic grafted copolymer such as HIPS and ABS resin), a homopolymer or copolymer comprising a halogen-containing monomer (e.g., a polyvinyl chloride, a vinylidene chloride copolymer), a vinyl-series resin (e.g., a polyvinyl acetate, a polyvinyl alcohol)], a condensation-series resin [e.g., a polycarbonate resin (e.g., a bisphenol A-based polycarbonate resin), polyimide-series resin, polysulfone-series resin, polyether sulfone-series resin, polyether ether ketone-series resin, polyarylate-series resin], and another resins.

In the vinyl polymerization-series resin, a modified resin may be obtained by copolymerization of a vinyl monomer and a monomer containing a carboxyl group or an acid anhydride group such as (meth)acrylic acid and maleic anhydride to introduce a carboxyl group or an acid anhydride group into the vinyl polymerization-series resin, and, if necessary, reacting the resulting resin with thionyl chloride to produce an acid chloride group, and reacting the resultant with ammonia, a mono-substituted amine (e.g., a monoalkylamine, a monoarylamine) or the diamine mentioned above to introduce an amino group into the resin. Further, a copolymerization of (poly)oxyalkylene glycol mono(meth)acrylate or a (poly)oxyalkylene glycol monoalkylether (meth)acrylate with the vinyl monomer, or a graft-polymerization of the mono(meth)acrylate to the vinyl polymerization-series resin may introduce the active hydrogen atom for a modification of the vinyl polymerization-series resin.

Further, for the condensation-series resin as well as the vinyl polymerization-series resin, a modification may be carried out by graft-polymerizing a carboxyl group- or an acid anhydride group-containing monomer with a resin to introduce the carboxyl group or the acid anhydride group, if necessary, by reacting the resulting resin with thionyl chloride to produce an acid chloride group, and by reacting the acid chloride group with ammonia, a mono-substituted amine, or the diamine mentioned above to introduce an amino group as same manner as in the above vinyl polymerization-series resin.

(Other Component)

The resin member may essentially comprise a thermoplastic resin having a given concentration of the active atom, and may be a resin composition comprising the above-mentioned thermoplastic resin and other thermoplastic resin. As the other thermoplastic resin, there may be mentioned an unmodified thermoplastic resin corresponding to the modified resin (δ) such as a styrenic resin, a (meth)acrylic resin, a homopolymer or copolymer of a halogen-containing monomer (e.g., fluorine-containing resin), a vinyl-series resin, a polycarbonate-series resin, a polyimide-series resin, a polysulfone-series resin, a polyether sulfone-series resin, a polyetheretherketone-series resin, a polyarylate-series resin, a liquid-crystal polyester resin, and the like.

The amount of the thermoplastic resin having the active atom is about 30 to 100% by weight, preferably about 50 to 100% by weight, and more preferably about 80 to 100% by weight based on the total amount of the resin components.

The resin composition for the resin member may comprise various additives, for example, a filler or reinforcer, a stabilizer (an ultraviolet ray absorber, an antioxidant, a heat stabilizer), a colorant, a plasticizer, a lubricant, a flame retardant, an antistatic agent, and other conventional additives.

[Rubber Member]

(Rubber)

The rubber member may be obtained by molding (or vulcanizing) a rubber composition comprising a radical-generating agent and a rubber. The rubber is not particularly restricted insofar as the rubber can react with the thermoplastic resin mentioned in the item Resin member, and various rubbers can be used. Particularly, in the present invention, since the thermoplastic resin is capable of being activated by the radical-generating agent, the rubber can be selected within the wide range.

The rubber may include, for example, a diene-series rubber, an olefinic rubber, an acrylic rubber, a fluorine-containing rubber, a urethane-series rubber, an epichlorohydrin rubber (e.g., a homopolymer CO of epichlorohydrin, a copolymer ECO of epichlorohydrin and ethylene oxide, a copolymer further copolymerized with an allyl glycidyl ether), a chlorosulfonated polyethylene, a propylene oxide rubber (GPO), an ethylene-vinyl acetate copolymer (EAM), a polynorbornene rubber, a modified rubber of these mentioned above (e.g., acid-introduced rubber), and other rubbers. These rubbers can be used singly or in combination. Among these rubbers, in view of a practical use, a widely used rubber includes usually the diene-series rubber, the olefinic rubber, the acrylic rubber, the fluorine-containing rubber, the urethane-series rubber, and so on.

As the diene-series rubber, there may be mentioned a natural rubber (NR); a polymer of a diene-series monomer such as an isoprene rubber (IR), an isobutylene-isoprene rubber (butyl rubber) (IIR), a butadiene rubber (BR), and a chloroprene rubber (CR); an acrylonitrile-diene copolymerized rubber such as an acrylonitrile-butadiene rubber (nitrile rubber) (NBR), a nitrile-chloroprene rubber (NCR), and a nitrile-isoprene rubber (NIR); a styrene-diene copolymerized rubber such as a styrene-butadiene rubber (SBR, for example, a random copolymer of styrene and butadiene, a SB-block copolymer comprising a styrene block and a butadiene block, and the like), a styrene-chloroprene rubber (SCR), and a styrene-isoprene rubber (SIR); and other diene-containing rubber. The diene-series rubber also includes a hydrogenated rubber, for example, a hydrogenated nitrile rubber (HNBR) or the like.

The olefinic rubber includes, for example, an ethylene-propylene rubber (EPM), an ethylene-propylene diene rubber (EPDM), a polyoctenylene rubber, and other rubbers.

The acrylic rubber includes a rubber comprising an alkyl acrylate as a main component such as a copolymer ACM of an alkyl acrylate and a chlorine-containing crosslinkable monomer, a copolymer ANM of an alkyl acrylate and acrylonitrile, a copolymer of an alkyl acrylate and a carboxyl group- and/or epoxy group-containing monomer, and an ethylene-acrylic rubber.

As the fluorine-containing rubber, there are exemplified a rubber using a fluorine-containing monomer, for example, a copolymer FKM of vinylidene fluoride and perfluoropropene, if necessary, tetrafluoroethylene; a copolymer of tetrafluoroethylene and propylene; a copolymer FFKM of tetrafluoroethylene and perfluoromethylvinylether.

The urethane rubber (U) includes, for example, a polyester-based urethane elastomer, a polyether-based urethane elastomer, and other elastomers.

As the modified rubber, there may be mentioned, for example, an acid-introduced rubber such as a carboxyl group- or acid anhydride group-containing rubber [e.g., a carboxylic styrene-butadiene rubber (X-SBR), a carboxylic nitrile rubber (X-NBR), a carboxylic ethylene-propylene rubber (X-EP(D)M)], and other functional group-containing rubbers.

(Radical-generating Agent)

In the present invention, the radical-generating agent not only vulcanizes (or crosslinks) the above rubber but also acts to the above thermoplastic resin (for example, activates the above thermoplastic resin radically by a hydrogen-drawing reaction in which the active hydrogen atom is drawn from the thermoplastic resin), to directly bond the thermoplastic resin and a vulcanized rubber by a crosslinking reaction. As the radical-generating agent, various radical-generators can be used depending on species of the thermoplastic resin or the rubber, and the radical-generating agent may be selected from, for example, an organic peroxide, an azo compound, a sulfur-containing organic compound other than a sulfur. Incidentally, since the sulfur causes an ionic reaction and has a considerably lower radical-generating efficiency, and further traps a generated radical, the sulfur is excluded from the radical-generating agent. The radical-generating agent can be used singly or in combination.

The organic peroxide includes, for example, a diacyl peroxide (e.g., lauroyl peroxide, benzoyl peroxide, 4-chlorobenzoyl peroxide, 2,4-dichlorobenzoyl peroxide), a dialkyl peroxide [e.g., di-t-butyl peroxide; 2,5-di(t-butylperoxy)-2,5-dimethylhexane; 1,1-bis(t-butylperoxy)-3,3,5-trimethylcyclohexane; 2,5-di(t-butylperoxy)-2,5-dimethylhexane-3,1,3-bis(t-butylperoxyisopropyl)benzene; dicumyl peroxide], an alkyl peroxide (e.g., t-butyl hydroperoxide, cumene hydroperoxide, 2,5-dimethylhexane-2,5-dihydroperoxide, diisopropylbenzene hydroperoxide), an alkylidene peroxide [e.g., ethylmethylketone peroxide, cyclohexanone peroxide, 1,1-bis(t-butylperoxy)-3,3,5-trimethylcyclohexane], a peracid ester (e.g., t-butyl peracetate, t-butyl perpivalate), etc.

The azo compound includes azoisobutylonitrile and other compound. The sulfur-containing organic compound includes, for example, a thiuram [e.g., tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT)], a dithiocarbamate (e.g., a salt of a $diC_{1-4}$alkyldithiocarbamic acid such as dimethyldithiocarbamic acid and diethyldithiocarbamic acid with sodium, potassium, iron, copper, zinc, selenium, or tellurium), a thiazole [e.g., 2-mercaptobenzothiazole, 2-(4'-morpholinodithio) benzothiazole], and the like.

As the radical-generating agent, a photopolymerization initiator also may be employed as far as a photoirradiation can be applied to an adhesion between the resin member and the rubber member. The photopolymerization initiator or photoinitiator may include, for example, a benzophenone or a derivative thereof (e.g., 3,3'-dimethyl-4-methoxybenzophenone, 4,4-dimethoxybenzophenone), an alkylphenylketone or a derivative thereof [e.g., acetophenone, diethoxyacetophenone, 2-hydroxy-2-methyl-1-phenylpropan-1-on, benzyldimethylketal, 1-hydroxycyclohexylphenylketone, 2-benzyl-2-dimethylamino-1-(morpholinophenyl)-butanone], an anthraquinone or a derivative thereof (e.g., 2-methyl anthraquinone), a thioxanthone or a derivative thereof (e.g., 2-chlorothioxanthone, an alkylthioxanthone), a benzoin ether or a derivative thereof (e.g., benzoin, a benzoin alkyl ether), a phosphine oxide or a derivative thereof, and others. The radical-generator also includes a persulfate (e.g., ammonium persulfate, potassium persulfate).

Among these radical-generating agents, the preferred agent is the organic peroxide.

The ratio of the radical-generating agent can be selected within a range of, for example, about 0.5 to 15 parts by weight, and is usually about 1 to 10 parts by weight, and preferably about 1 to 8 parts by weight (e.g., about 2 to 7 parts by weight) relative to 100 parts by weight of an unvulcanized rubber.

(Vulcanization-activating Agent or Activator)

In the present invention, a vulcanization-activating agent (hereinafter may be sometimes referred to as a hardening agent) may be used together with the radical-generating agent in order to enhance an adhesion efficiency by the radical-generating agent. The vulcanization-activating agent accelerates not only a vulcanization of rubbers but also a crosslinking between the rubber molecule and the resin molecule to bond firmly the rubber member and the resin member. For example, when a thermoplastic resin comprises a polyphenylene ether resin, use of a radical-generating agent and a vulcanization-activating agent in combination progresses a crosslinking reaction between the resin member and the rubber member to ensure the bonding of the members firmly or strongly. The amount of the vulcanization-activating agent may be an amount required for the acceleration of rubber vulcanization and the crosslinking formation between rubbers and resins, and an excess amount of the activating agent may deteriorate a rubber's property. Therefore, an appropriate amount of vulcanization-activating agent can be selected suitably.

As the vulcanization-activating agent, there may be mentioned, for example, an organic compound having a carbon-carbon double bond (a polymerizable unsaturated bond) [e.g., a vinyl-series monomer (e.g., divinylbenzene), an allyl-series monomer (e.g., a diallyl phthalate, a triallyl phosphate, a triallyl(iso)cyanurate, a (meth)acrylic monomer], a maleimide-series compound, and other unsaturated compounds. These vulcanization-activating agents (activators) can be used singly or in combination. As the vulcanization-activating agent, a vulcanization-activating agent having the polymerizable unsaturated bond of not less than 2 is practically used.

Examples of the (meth)acrylic monomer include a bifunctional (meth)acrylate [e.g., a $C_{2-10}$alkylene glycol di(meth)acrylate such as ethylene glycol di(meth)acrylate, propylene glycol di(meth)acrylate, 1,4-butanediol di(meth)acrylate, hexanediol di(meth)acrylate, and neopentyl glycol di(meth)acrylate; a poly$C_{2-4}$alkylene glycol di(meth)acrylate such as diethylene glycol di(meth)acrylate, triethylene glycol di(meth)acrylate, polyethylene glycol di(meth)acrylate, dipropylene glycol di(meth)acrylate, tripropylene glycol di(meth)acrylate, polypropylene glycol di(meth)acrylate, and polytetramethylene glycol di(meth)acrylate; glycerol di(meth)acrylate; trimethylolpropane di(meth)acrylate; pentaerythritol di(meth)acrylate; and di(meth)acrylate of bisphenol A-$C_{2-4}$ alkylene oxide-adduct], a tri- or poly-functional (meth)acrylate [e.g., glycerol tri(meth)acrylate, trimethylolethane tri(meth)acrylate, trimethylolpropane tri(meth)acrylate, pentaerythritol tri(meth)acrylate, pentaerythritol tetra(meth)acrylate, dipentaerythritol tetra(meth)acrylate, dipentaerythritol hexa(meth)acrylate].

A maleimide-series compound having a plurality of maleimide groups can be obtained by a reaction of a polyamine with a meleic anhydride. Examples of the maleimide-series compound include an aromatic bismaleimide [e.g., N,N'-1,3-phenylenedimaleimide, N,N'-1,4-phenylenedimaleimide, N,N'-(3-methyl-1,4-phenylene)dimaleimide, 4,4'-bis(N,N'-maleimide)diphenylmethane, 4,4'-bis(N,N'-maleimide)diphenyl sulfone, 4,4'-bis(N,N'-maleimide)diphenyl ether], an aliphatic bismaleimide (e.g., N,N'-1,2-ethylenebismaleimide, N,N'-1,3-propylenebismaleimide, N,N'-1,4-tetramethylenebismaleimide), etc.

The preferred vulcanization-activating agent includes a compound having a plurality (e.g., about 2 to 6, particularly about 3 to 6) of a carbon-carbon double bond (polymerizable unsaturated bond) per molecule, for example, a triallyl(iso)cyanurate, a di- or poly-functional (meth)acrylate (in particular, tri- or poly-functional (meth)acrylate), and an aromatic maleimide compound.

In the present invention, the addition of the vulcanization-activating agent is not essential. For example, depending on the number of an active atom of a thermoplastic resin and species of a rubber material to be used, the presence of the vulcanization-activating agent is not required to bond both members. In practical cases, however, in order to ensure firmly bonding of the rubber member and the resin member, the vulcanization-activating agent is advantageously added. The vulcanization-activating agent may be added to at least one component selected from the unvulcanized rubber (or unvulcanized rubber composition) and the thermoplastic resin (or a resin composition), and may be added to both components. The vulcanization-activating agent is usually added to the unvulcanized rubber. The amount of the vulcanization-activating agent is varied depending on species of the vulcanization-activating agent and species of the component to be added (the unvulcanized rubber and/or the thermoplastic resin), and is usually an effective amount for accelerating an adhesion or bonding between the thermoplastic resin and the rubber, for example, about 0.1 to 10 parts by weight, preferably about 0.1 to 5 parts by weight, and more preferably about 0.1 to 3 parts by weight, relative to 100 parts by weight of at least one component selected from the rubber and the resin. For example, in the case where the vulcanization-activating agent comprises a methacrylate of a polyhydric alcohol, the amount of the vulcanization-activating agent is about 0.1 to 10 parts by weight, preferably about 0.1 to 5 parts by weight, more preferably about 0.1 to 3 parts by weight, and practically about 0.1 to 1.9 parts by weight (e.g., 0.5 part by weight, 1.0 part by weight), relative to 100 parts by weight of at least one component selected from the rubber and the resin. Moreover, in the case that the vulcanization-activating agent is added both of the resin and the rubber, a small amount of the vulcanization-activating agent may be added to the resin, and the vulcanizing activator may be used in a proportion of about 0.1 to 7 parts by weight, preferably about 0.1 to 5 parts by weight, and more preferably about 0.1 to 3 parts by weight, relative to 100 parts by weight of the resin.

An excess amount of the vulcanization-activating agent may significantly affect properties of the rubber member or the resin member, depending on species of the vulcanization-activating agent. For example, the addition of the excess amount of the vulcanization-activating agent to the rubber component causes troublesomeness, for example, a far higher hardness of a vulcanized rubber than a designed value, and significant deterioration in a long-term property of the rubber member such as a weather resistance. Moreover, the addition of the excess amount of the vulcanization-activating agent to the resin component causes a gel-formation accompanying with a resin member molding to make an appropriate molding difficulty, and a decrease of a mechanical strength. Further, the added vulcanization-activating agent may be migrated from the resin member.

Therefore, in any case of addition of the vulcanization-activating agent to the rubber component or the resin member, the exceeding amount of more than 10 parts by weight of the vulcanization-activating agent relative to 100 parts by weight of an added object (rubber or resin) is objectionable, and it should be carefully handled the amount of not less than 5 parts by weight, and thus, prior to practical usage, a consequence for the amount of the vulcanization-activating agent to the added object may have been examined. To obtain a sufficient bonding strength between the rubber member and the resin member without any considerations affecting the object to be added, the amount of the vulcanization-activating agent is, for the object comprising a rubber, not more than 2 parts by weight, for example, about 0.1 to 1.9 parts by weight (e.g., about 0.5 to 1.9 parts by weight) relative to 100 parts by weight of the rubber, and for the object comprising a resin, not more than 5 parts by weight, for example, about 0.1 to 5 parts by weight (e.g., about 3 to 5 parts by weight) relative to 100 parts by weight of the resin.

When the vulcanization-activating agent is added to the rubber, the proportion of the radical-generating agent and the vulcanization-activating agent (weight ratio) may be such that, for example, the former/the latter is equal to about 0.3/1 to 20/1 (e.g., about 0.5/1 to 20/1), preferably about 0.4/1 to 15/1 (e.g., about 1/1 to 15/1), and more preferably about 0.5/1 to 10/1 (e.g., about 2/1 to 10/1).

Incidentally, as described later, the vulcanization-activating agent is not essentially added to the rubber composition and/or the resin composition, and may be applied or coated on a bonding surface or site of the rubber member and/or the resin member.

(Vulcanization auxiliary)

In the present invention, to enhance the adhesion efficiency, a vulcanization auxiliary may be used. According to species of the rubber and the resin, an addition of the vulcanizing auxiliary make a bonding between a rubber member and the resin member firmly. The vulcanization auxiliary may be added to at least one component selected from an unvulcanized rubber (or an unvulcanized rubber composition) and a thermoplastic resin (or a resin composition), and may be added to both components. Usually, the vulcanization auxiliary may be added to the thermoplastic resin.

The vulcanization auxiliary can be selected depending on species of the resin and the rubber, and includes, for example, an oligomer of the thermoplastic resin described in the headings (1) to (8) (e.g., an oligomer having a number-average molecular weight of about 100 to 1000 such as an oligomer of the polyamide-series resin and an oligomer of the polyester-series resin), a polyamine [e.g., the polyamine described in the heading (2) polyester-series resin], a polyol [e.g., the polyol described in the heading (2) polyester-series resin], a polycarboxylic acid or an acid anhydride thereof, a plural-aldehyde groups containing compound, an epoxy compound, a nitrogen-containing resin (e.g., an amino resin), a methylol group- or alkoxymethyl group-containing compound, a polyisocyanate, and the like. These vulcanization auxiliaries may be used singly or in combination.

The preferred vulcanization auxiliary includes a compound having not less than 2 of an active hydrogen atom on the average per molecule, each hydrogen atoms having a predetermined value of an orbital interaction energy coefficient S represented by the formula (1), for example, the oligomer of the thermoplastic resin described in the heads (1) to (8) (e.g., the oligomer of the above mentioned polyamide-series resin and the oligomer of the polyester-series resin), the above mentioned polyamine, and the other.

The amount of the vulcanization auxiliary is, for example, about 0.1 to 30 parts of weight, preferably about 0.5 to 20 parts of weight, and about 1 to 15 parts of weight, relative to 100 parts of weight of the rubber and/or the resin.

(Other Additive)

To the rubber composition mentioned above may be added, if necessary, various additives, for example, a filler, a plasticizer or softening agent, a co-vulcanizing agent (e.g., a metal oxide such as zinc oxide), an age resistor (e.g., a heat resistant, an antiozonant, an antioxidant, an ultraviolet ray absorber), a tackifier, a processing auxiliary, a lubricant (e.g., stearic acid, a metal stearate, a wax), a colorant, a forming agent, a dispersant, a flame retardant, an antistatic agent, and so forth.

The filler (or reinforcer) includes, for example, a powdery or particulate filler or reinforcer (e.g., a mica, a clay, a talc, a silicic acid, a silica, a calcium carbonate, a magnesium carbonate, a carbon black, a ferrite), a fibrous filler or reinforcer (e.g., an organic fiber such as rayon, nylon, vinylon, and aramid; an inorganic fiber such as a carbon fiber and a glass fiber), and other fillers.

The plasticizer is not particularly restricted so far as a plasticity can be imparted to the rubber composition, and includes conventional softening agents (e.g., a plant oil such as linolic acid, oleic acid, castor oil, and perm oil; a mineral oil such as a paraffin oil, a process oil, and an extender oil) and plasticizers (e.g., a phthalic acid ester, an aliphatic dicarboxylic acid ester, a sulfur-containing plasticizer, a polyester-series polymer plasticizer).

The content of the filler may be, for example, about 0 to 300 parts by weight, preferably about 0 to 200 parts by weight, and more preferably about 0 to 100 parts by weight, relative to 100 parts by weight of the rubber. The proportion of the plasticizer or softening agent may be, for example, of about 0 to 200 parts by weight, preferably about 0 to 150 parts by weight, and more preferably about 0 to 120 parts by weight, relative to 100 parts by weight of the rubber. The each of the co-vulcanizing agent, the age resistor, the processing agent or lubricant, or the colorant may be used in a proportion of an effective amount, and the amount of the co-vulcanizing agent may, for example, be about 0 to 20 parts by weight, preferably about 0.5 to 15 parts by weight, and more preferably about 1 to 10 parts by weight relative to 100 parts by weight of the rubber.

According to the present invention, since a thermoplastic resin containing an active atom in a predetermined concentration and a rubber are combined, it is possible to bond or unite the resin member comprising the thermoplastic resin and the rubber member comprising the vulcanized rubber in a wide range combination, and further, if necessary, the coexistence of the vulcanization-activating agent ensures the intimate adhesion firmly. Therefore, the combination of the thermoplastic resin and the rubber is not particularly restricted to a specific combination, and the following combinations (a) to (i) may, for example, be mentioned;

(a) a combination of a polyamide-series resin with a unvulcanized rubber comprising a radical-generating agent and being substantially free from modification or introduction of a carboxyl group or an acid anhydride group;

(b) a combination of a polyamide-series resin with a unvulcanized rubber which comprises a radical-generating agent and a polyfunctional vulcanization-activating agent having two or more functional group (e.g., polyfunctional vulcanization-activating agent having three or more functional group) and substantially free from an alkoxy silane compound, that is, in the present invention, an unmodified rubber (e.g., a rubber unmodified or unintroduced by a carboxyl group/an acid anhydride group) as an unvulcanized rubber can be used without utilizing the reaction between an amino group of the polyamide-series resin and a carboxyl group or an acid anhydride group of the rubber, and therefore an applicability of the combination of polyamide-series resin (e.g., an aliphatic polyamide-series resin) with the rubber can be widely expanded;

(c) a combination of an aromatic polyester-series resin having an amino group and an oxyalkylene group with an unvulcanized rubber comprising a radical-generating agent;

(d) a combination of a polyacetal-series resin with an unvulcanized rubber comprising a radical-generating agent;

(e) a combination of a polyphenylene ether-series resin with an unvulcanized rubber comprising a radical-generating agent and a vulcanization-activating agent;

(f) a combination of a polysulfide-series resin with an unvulcanized rubber comprising a radical-generating agent;

(g) a combination of a polypropylene-series resin with an unvulcanized rubber comprising a radical-generating agent;

(h) a combination of a polyurethane-series resin with an unvulcanized rubber comprising a radical-generating agent;

(i) a combination of a thermoplastic elastomer with an unvulcanized rubber comprising a radical-generating agent.

In such combinations, the preferred radical-generating agent includes an organic peroxide, and the preferred vulcanization-activating agent comprises a di- or poly-functional vulcanization-activating agent (particularly tri- or poly-functional (meth)acrylate).

[Process for Producing a Composite]

In the present invention, a composite of a resin member comprising the thermoplastic resin bonded to a rubber member comprising a vulcanized rubber can be produced by use of a combination of the thermoplastic resin and an unvulcanized rubber comprising a radical-generating agent. The composite (or resin/rubber composite) can be produced by molding a resin molding element or material and a rubber molding element or material with contacting each other and a vulcanizing or crosslinking the rubber molding member or element.

The resin molding element or material may be a resin composition comprising a thermoplastic resin, or a resin preformed or premolded member beforehand (or a resin shaped article). Moreover, the rubber molding element or material is not particularly restricted to a specific member as far as the rubber molding member or element has an active radical-generating agent on a surface contacted with the resin molding member or element and comprises at least an unvulcanized rubber. The rubber molding element or material may be an unvulcanized rubber composition, or a rubber preformed or premolded article (rubber molded precursor) having a partially vulcanized or crosslinked rubber.

That is, the composite may be produced by molding a resin composition comprising a thermoplastic resin (preferably a resin composition containing at least the vulcanization-activating agent) and an unvulcanized rubber composition comprising an unvulcanized rubber and a radical-generating agent (preferably a unvulcanized rubber composition further comprising at least the vulcanization-activating agent) with contacting each other, and vulcanizing or crosslinking the unvulcanized rubber composition to bond or join the resin member and the rubber member.

Moreover, as far as the radical-generating agent is activated, at least one member selected from the resin member (or a shaped resin article) and the rubber member (or a shaped rubber article) may have been molded or formed beforehand. The examples of the molding technique are further illustrated as follows:

(1) a composite may be produced by contacting a resin member comprising a thermoplastic resin with an unvulcanized rubber composition, and then molding the unvulcanized rubber composition with vulcanizing or crosslinking the unvulcanized rubber composition.

(2) a composite may be produced by contacting a premolded rubber article (a precursor or intermediate) comprising a preliminarily vulcanized or crosslinked rubber composition with the resin composition mentioned above, and molding the resin composition in a desired shape.

(3) a composite may be produced by contacting a resin member comprising a thermoplastic resin with a premolded rubber article (a precursor) obtained by vulcanizing or crosslinking the rubber composition to be molded. Incidentally, the preformed rubber article has an activated radical-generating agent at least on a surface contacted with the resin molding member or element, and may have a residual radical-generating agent.

More concretely, the process of the present invention includes a process which comprises contacting or meeting (or converging) a resin composition with an unvulcanized rubber composition with molding the resin composition and the unvulcanized rubber composition respectively in a metal mold to bond or adhere directly the resin member and the vulcanized rubber member (one-step method); a process which comprises contacting a premolded or preformed resin member with an unvulcanized rubber composition, and molding the unvulcanized rubber composition by vulcanizing or crosslinking the unvulcanized rubber composition to join or bond the resin member and the vulcanized rubber member (two-step method); a process comprising a step for contacting a premolded resin member with a preformed rubber article produced by molding an unvulcanized rubber composition to the intermediate stage (partially vulcanized or crosslinked), and a step for vulcanizing or crosslinking the premolded rubber article to bond or adhere the resin member and the vulcanized rubber member (three-step method); and other molding methods.

The preferred process includes the one-step method and the two-step method (particularly the two-step method). In the one-step method, a composite molded article can be obtained by melting and kneading the resin composition and the unvulcanized rubber composition, respectively, injecting or extruding the molten and kneaded compositions into a metal mold having a desired cavity or configuration with use of, for example, a conventional multi-molding apparatus (e.g., a multi-injection molding apparatus, a multilayer extruder), and vulcanizing or crosslinking the unvulcanized rubber on or after the molding. The resin composition and the unvulcanized rubber composition may be mixed or mingled at or in the contact interface area between these compositions.

In the two-step method, a conventional molding apparatus (e.g., an injection molding apparatus, an extrusion molding apparatus, a thermal-press molding apparatus) can be used for forming the shaped resin member, and a conventional molding apparatus (e.g., an injection molding apparatus, a press molding apparatus, a transfer molding apparatus, an extrusion molding apparatus) can be used for forming the rubber member. In the molding process, a vulcanized rubber member and a resin member may be bonded or adhered by placing or setting a resin member into a mold (or a cavity) in conformity with a configuration of a composite, injecting or extruding an unvulacanized rubber composition to the resin member, and vulcanizing or crosslinking the unvulacanized rubber composition. Moreover, when the shape of the composite is a plate- or sheet-like member having a two-dimensional configuration, the composite may be produced by laminating a plate- or sheet-like unvulcanized rubber composition to a shaped resin member, and vulcanizing or crosslinking the unvulacanized rubber composition without the mold (or cavity). Incidentally, when contacting (e.g., closely contacting or adhering) a resin member (or a resin composition) with an unvulcanized rubber composition, a pressure molding may be conducted by applying a pressure suitably with use of a thermalpress molding or an injection molding, for example, under a reduced pressure in order to remove a volatile component or a gas component from the composition(s).

The vulcanization (or curing) or crosslinking temperature (or a bonding temperature between the rubber member and the resin member) can be selected, for example, from about 70 to 250° C., preferably about 100 to 230° C., and more preferably about 150 to 220° C. The pressure loaded to the rubber and the resin can be selected, for example, from within the range of about 0 to 350 MPa, preferably about 1 to 150 MPa, and more preferably about 2 to 100 MPa.

In the production process of the composite, at least one component selected from an unvulcanized rubber and a thermoplastic resin may comprise a vulcanization-activating agent (e.g., a polymerizable compound having the above mentioned plural polymerizable groups) and a vulcanization auxiliary (e.g., the above mentioned polyamine). Usually, the vulcanization auxiliary is added practically to the thermoplastic resin.

Moreover, as described above, the vulcanization-activating agent is usually incorporated into the unvulcanized rubber composition (or the rubber member) and/or the resin composition, and the process of the present invention also includes a production process of a composite of the resin member bonded to the rubber member by molding the resin molding member or element and the rubber molding member or element under heating with interposing at least the vulcanization-activating agent (if necessary, further incorporation of the vulcanization auxiliary) on a contacting surface (or a bonding surface) between the resin molding member or element and the rubber molding member or element.

Further, the process of the present invention also includes a process for producing a composite by pressing or contacting a shaped resin member comprising a thermoplastic resin with a vulcanized rubber member under heating with interposing at least the vulcanization-activating agent (if necessary, further incorporation of the vulcanization auxiliary) on a contacting surface (or a bonding surface) between the resin member and the vulcanized rubber member to bond or adhere the resin member and the rubber member. In the process, the vulcanized rubber member is not essentially vulcanized or crosslinked by the radical-generating agent (e.g., an organic peroxide), and may be vulcanized with use of a sulfur containing vulcanizing agent. In the preferred process, a shaped resin member or element of the thermoplastic resin is used in a combination with a shaped rubber member or element of the unvulcanized rubber composition. That is, a resin member comprising the thermoplastic resin is preferably combined with a vulcanized rubber member obtained from an unvulcanized rubber composition comprising at least a radical-generating agent and an unvulcanized rubber.

Furthermore, on an interface between the resin member and the vulcanized rubber member, a coating agent comprising at least the vulcanization-activating agent (if necessary, further the vulcanization auxiliary) may be interposed by a coating technique, and the coating agent may be a radically active agent comprising the radical-generating agent and the vulcanization-activating agent (if necessary, further the vulcanization auxiliary). The amount of the coating agent on the interface between the resin member and the vulcanized rubber member may, for example, be about 0.1 to 10 g/m², preferably about 0.5 to 5 g/m², and particularly about 1 to 5 g/m².

The composite of the resin member bonded to the vulcanized rubber member can be obtained by heating (in particular, heat-pressing) the resin member and the vulcanized rubber member with interposing the above mentioned coating agent between these members. The heating temperature and pressure can be selected within the range similar to the vulcanization or crosslinking temperature and pressure mentioned above.

Moreover, it is effective for bonding the resin member to the unvulcanized rubber member that a surface of the resin member is treated with a solvent capable of dissolving or swelling the resin member by a treatment such as coating or dipping, and the treated surface is contacted with the unvulcanized rubber composition. The solvent can be selected, depending on species of the resin member and includes, for example, a hydrocarbon (e.g., an aliphatic hydrocarbon such as hexane and octane, an alicyclic hydrocarbon such as cyclohexane, an aromatic hydrocarbon such as toluene and xylene), an alcohol (e.g., an alcohol such as isopropanol, butanol, and cyclohexanol; a haloalkylalcohol such as tetrafluoroethanol and hexafluoroisopropanol), a phenol (e.g., phenol, cresol), an organic acid (e.g., formic acid, acetic acid, trifluoroacetic acid, trichloroacetic acid), an ester (e.g., ethyl acetate, butyl acetate), a ketone (e.g., acetone, methyl ethyl ketone, methyl isobutyl ketone), an ether (e.g., dioxane, diethyl ether, tetrahydrofuran), a sulfoxide (e.g., dimethyl sulfoxide), an amide (e.g., dimethylformamide, dimethylacetoamide), and a mixture thereof.

For example, for a resin comprising a polyamide resin, a solvent such as a phenol (e.g., phenol, cresol), an organic acid (e.g., formic acid), a ketone (e.g., hexafluoroacetone), an alcohol (e.g., hexafluoro isopropyl alcohol) may be coated singly or in combination with a conventional solvent on the contacting surface with the rubber member. Moreover, for a resin comprising a polyphenylene ether resin, as the solvent or a swelling agent, there may be, for example, exemplified with a hydrocarbon (e.g., toluene), a ketone (e.g., acetone, methyl ethyl ketone, hexafluoroacetone), an ether (e.g., tetrahydrofuran), an amide (e.g., dimethylformamide), an alcohol (e.g., hexafluoroisopropylalcohol), and so on.

After treating the resin member with the solvent, even if the solvent is removed from the resin member by washing, drying, or other methods, the firmly bonding of the vulcanized rubber member to the resin member can be realized by contacting the treated surface of the resin member with the unvulcanized rubber composition.

Thus, the obtained composite has a markedly high adhesive strength between the rubber member and the resin member by vulcanization. Therefore, both properties of the thermoplastic resin and the rubber can be effectively expressed, and the obtained composite can be advantageously employed as various applications, for example, an automobile part (e.g., a vibration- or shock-absorbing bush, a spring plate, a door locking part, a radiator mount), a rubber vibration isolator, a valve, an electrical plug, and other parts or elements.

INDUSTRIAL APPLICABILITY

According to the present invention, a thermoplastic resin containing a predetermined concentration of a hydrogen or sulfur atom, each atom having a specific orbital interaction energy coefficient, is combined with an unvulcanized rubber comprising a radical-generating agent. Thus, the resin can be directly bonded to the rubber firmly without an adhesive in a wide combination to obtain a composite having a high adhesive strength.

EXAMPLES

The following examples are intended to describe this invention in further detail and should by no means be interpreted as defining the scope of the invention. In Examples and Comparative examples, the following resin composition and rubber composition were used.

[Resin Compositions (A) to (J)]

Resin Compositions A1 to A6

The following resin compositions (A1 to A6) were prepared by use of a polyamide 612 (a polycondensate of hexamethylenediamine and dodecanedicarboxylic acid) as a thermoplastic resin. A MOPACPM3 calculation was carried out for the following basic constitutive unit.

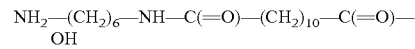

Resin Composition (A1):

A polyamide 612 [terminal $NH_2$/terminal COOH=9/1 (molar ratio)]

(Preparation)

A predetermined amount of hexamethylenediamine was added to 80% by weight aqueous solution of a salt of hexamethylenediamine with dodecanedicarboxylic acid, and the mixture was heated at 220° C. under an applied pressure (17.5 kg/cm$^2$) in an autoclave substituted with nitrogen gas to flow out water with nitrogen gas from the inside to the outside of the reaction system for 4 hours. Subsequently, the temperature of the system was gradually raised to 275° C. over 1 hour to discharge a residual water in the system, and the applied pressure of the autoclave was reduced to be an atmospheric pressure. After cooling the system, a polyamide 612 was obtained. The obtained polymer had a number average molecular weight (Mn) of about 20,000 and a ratio of terminal amino group/terminal carboxyl group=9/1. The polymer was used alone for Resin composition (A1).

Resin Composition (A2):

50% by weight of a polyamide 612 [terminal $NH_2$/terminal COOH=9/1 (molar ratio)]

50% by weight of a carbon staple (shorten-fiber)

(Preparation)

Equal or equivalent amounts of Resin composition (A1) and a carbon fiber were kneaded by a biaxial extruder, and the kneaded one was used for Resin composition (A2).

Resin Composition (A3):

12% by weight of a polyamide 612 [terminal $NH_2$/terminal COOH=9/1 (molar ratio)]

88% by weight of a soft ferrite (Preparation)

100 parts by weight of Resin composition (A1) and 733 parts by weight of a soft ferrite were kneaded by a kneader, and the resultant was used for Resin composition (A3).

Resin Composition (A4):

A polyamide 612 [terminal $NH_2$/terminal COOH=1/1 (molar ratio)]

(Preparation)

An aqueous solution containing a salt of hexamethylenediamine with dodecanedicarboxylic acid in an amount of 80% by weight was heated at 220° C. under an applied pressure (17.5 kg/cm$^2$) in an autoclave substituted with nitrogen gas to flow out water with nitrogen gas from the reaction system for 4 hours. Subsequently, the temperature of the system was gradually increased to 275° C. over 1 hour to remove water remaining in the system, and the applied pressure of the autoclave was reduced to be an atmospheric pressure. After cooling the system, a polyamide 612 was obtained. The polymer had a molecular weight (Mn) of about 20000 to 25000, and a ratio of terminal amino group/terminalcarboxyl group=1/1. The polymer was used alone for Resin composition (A4).

Resin Composition (A5):

A polyamide 612 [terminal $NH_2$/terminal COOH=3/7 (molar ratio)]

(Preparation)

A resin composition (A1) and the following resin composition (A6) were kneaded in a proportion of the former/the latter=1/3 (weight ratio) by a biaxial extruder. The obtained composition was used for Resin composition (A5).

Resin Composition (A6):

A polyamide 612 [terminal $NH_2$/terminal COOH=1/9 (molar ratio)]

(Preparation)

To an aqueous solution containing a salt of hexamethylenediamine with dodecanedicarboxylic acid in an amount of 80% by weight was added a predetermined amount of dodecanedicarboxylic acid, and the mixture was heated at 220° C. under an applied pressure (17.5 kg/cm$^2$) in an autoclave substituted with nitrogen gas to remove water with nitrogen gas from the reaction system for 4 hours. Subsequently, the temperature of the system was gradually elevated to 275° C. with taking 1 hour to discharge a residual water in the system, and the applied pressure of the autoclave was reduced to be an atmospheric pressure. After cooling, a polyamide 612 was obtained. The obtained polymer had a molecular weight (Mn) of about 20000 and a ratio of terminal amino group/terminal carboxyl group=1/9. The polymer was used for Resin composition (A6).

Resin Compositions B1 to B2

The following resin compositions (B1 to B2) were prepared by use of a polyamide 66 (a polycondensate of hexamethylenediamine and adipic acid) as a thermoplastic resin. A calculation with MOPACPM3 was carried out for the following constitutive unit.

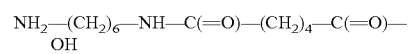

Resin Composition (B1):

A polyamide 66 [terminal $NH_2$/terminal COOH=1/1 (molar ratio)]

(Preparation)

A resin composition was prepared by the same manner as in Resin composition (A4) except for using a monomer combination of hexamethylenediamine and adipic acid to obtain a polyamide 66 having a molecular weight (Mn) of about 20000 to 25000 and a ratio of terminal amino group/terminal carboxyl group=1/1. The polyamide 66 was used for Resin composition (B1).

Resin Composition (B2):

A polyamide 66 [terminal $NH_2$/terminal COOH=1/3 (molar ratio)]

(Preparation)

A preparation procedure was conducted in the same manner as in Resin composition (A6) except for using a monomer combination of hexamethylenediamine and adipic acid to obtain a polyamide 66 having a molecular weight (Mn) of about 20000 of and a ratio of terminal amino group/terminal carboxyl group=1/9. The polyamide 66 and Resin composition (B1) were kneaded in a weight ratio of 62.5/37.5 by a biaxial extruder, and the resulting resin composition was employed for Resin composition (B2).

Resin Compositions C1 to C3

The following resin compositions (C1 to C3) were prepared with use of a polyamide 6 (a ring-opening polymerized product of ε-caprolactam) as a thermoplastic resin. A calculation with MOPACPM3 was carried out with use of the following unit as a constitutive unit.

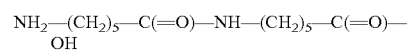

Resin Composition (C1):

A polyamide 6 [terminal $NH_2$/terminal COOH=1/1 (molar ratio)]

(Preparation)

An aqueous solution containing ε-caprolactam in an amount of 80% by weight was heated at 250 to 260° C. in the presence of a small amount of phosphoric acid in an autoclave substituted with nitrogen gas to remove water with nitrogen gas from the reaction system for 4 hours. Subsequently, the temperature of the inside system was gradually elevated to 275° C. for taking 1 hour to remove a residual water to outside system. After cooling, a polyamide 6 was obtained. The obtained polymer had a molecular weight (Mn) of about 20000 to 25000 and a ratio of terminal amino group/terminal carboxyl group=1/1. The polymer was used for Resin composition (C1).

Resin Composition (C2):
A polyamide 6 (terminal NH$_2$/terminal COOH=1/3 (molar ratio))

(Preparation)
A predetermined amount of adipic acid was added to an aqueous solution containing ε-caprolactam in an amount of 80% by weight, and the mixture was heated at 250 to 260° C. in the presence of a small amount of phosphoric acid in an autoclave substituted with nitrogen gas to flow out water with nitrogen gas from the reaction system for 4 hours. The temperature of the system was gradually raised to 275° C. with taking 1 hour to remove a residual water from the system, and the applied pressure of the autoclave was reduced to be an atmospheric pressure. After cooling, a polyamide 6 was obtained. The polyamide 6 had a molecular weight (Mn) of about 20000 and a ratio of terminal amino group/terminal carboxyl group=1/9. The polymer was used for Resin composition (C4). Resin composition (C4) and Resin composition (C1) were kneaded in a weight ratio of the former/the latter=37.5/62.5, and the resulting resin composition was employed for Resin composition (C2).

Resin Composition (C3):
A polyamide 6 [terminal NH$_2$/terminal COOH=1/4 (molar ratio)]

(Preparation)
Resin composition (C1) and Resin composition (C4) were kneaded in a weight ratio of 25/75 as the former/the latter ratio to obtain Resin composition (C3).

Resin Compositions D1 to D3
The following resin compositions (D1 to D3) were prepared by using a polyamide 46 (a polycondensation product of diaminobutane and adipic acid) as a thermoplastic resin. A calculation with MOPACPM3 was carried out for the following constitutive unit.

NH$_2$—(CH$_2$)$_4$—NH—C(=O)—(CH$_2$)$_4$—C(=O)—OH

Resin Composition (D1):
A polyamide 46 [terminal NH$_2$/terminal COOH=1/1 (molar ratio)]

Resin Composition (D2):
A polyamide 46 [terminal NH$_2$/terminal COOH=1/3 (molar ratio)]

Resin Composition (D3):
A polyamide 46 (terminal NH$_2$/terminal COOH=1/4 (molar ratio))

Resin Compositions E1 to E3
The following resin compositions (E1 to E3) were prepared by using a polycondensate of terephthalic acid and trimethylhexamethylenediamine (an aromatic polyamide A5) as a thermoplastic resin. A MOPACPM3 calculation was carried out for the following constitutive unit.

H$_2$N—CH(CH$_3$)—CH$_2$—C(CH$_3$)$_2$—CH$_2$—CH(CH$_3$)—CH$_2$—NH—C(=O)—C$_6$H$_4$—COOH

Resin Composition (E1):
An aromatic polyamide A5 [terminal NH$_2$/ terminal COOH=1/1 (molar ratio)]

(Preparation)
A resin composition was prepared in the same manner as in Resin composition (A4) except for using a monomer combination of trimethylhexamethylene diamine and terephthalic acid to give a polymer having a molecular weight (Mn) of about 20000 to 25000 and a weight ratio of terminal amino group/terminal carboxyl group=1/1. The polymer was used as Resin composition (E1).

Resin Composition (E2)
An aromatic polyamide A5 [terminal NH$_2$/terminal COOH=1/3 (molar ratio)]

(Preparation)
A resin composition was prepared in the same manner as in Resin composition (A6) except for using a monomer combination of trimethylhexamethylene diamine and terephthalic acid to obtain a polymer having a molecular weight (Mn) of about 20000 and a weight ratio of terminal amino group/terminal carboxyl group=1/9. The polymer was used for Resin composition (E4). Resin composition (E4) and Resin composition (E1) were kneaded in a weight ratio of 62.5/37.5 by a biaxial extruder, and the obtained resin composition was used as Resin composition (E2).

Resin Composition (E3):
An aromatic polyamide A5 [terminal NH$_2$/terminal COOH=1/4 (molar ratio)]

(Preparation)
Resin composition (E1) and Resin composition (E4) were kneaded in a weight ratio of 25/75 as the former/the latter to obtain Resin composition (E3).

Resin Compositions F1 to F3
The following resin compositions (F1 to F3) were prepared by using a polycondensation product of dodecanedicarboxylic acid and bis(4-aminocyclohexyl)methane (an alicyclic polyamide A6) as a thermoplastic resin. The following constitutive unit was used for a MOPACPM3 calculation.

H$_2$N—C$_6$H$_{10}$—CH$_2$—C$_6$H$_{10}$—NH—(C=O)—(CH$_2$)$_{10}$—C(=O)—OH

Resin Composition (F1):
An alicyclic polyamide A6 [terminal NH$_2$/terminal COOH=1/1 (molar ratio)]

(Preparation)
The same manner as in Resin composition (A4) was repeated except for using a monomer combination of bis(4-aminocyclohexyl) methane and dodecanedicarboxylic acid to obtain a polymer having a molecular weight (Mn) of about 20000 to 25000 and a ratio of terminal amino group/ terminal carboxyl group=1/1. The polymer was employed as Resin composition (F1).

Resin Composition (F2):
An alicyclic polyamide A6 [terminal NH$_2$/terminal COOH=1/2 (molar ratio)]

(Preparation)
A resin composition was produced by the same manner as in Resin composition (A6) except for using a monomer combination of bis(4-aminocyclohexyl) methane and dodecanedicarboxylic acid to give a polymer having a molecular weight (Mn) of about 20000 of and a weight ratio of terminal amino group/terminal carboxyl group=1/9. The polymer was Resin composition (F4). Resin composition (F4) and Resin composition (F1) were kneaded in a weight ratio of 133.4/

66.6 as the former/the latter ratio by a biaxial extruder, and the obtained resin composition was used as Resin composition (F2).

Resin Composition (F3):

An alicyclic polyamide A6 [terminal NH$_2$/terminal COOH=1/3 (molar ratio)]

(Preparation)

Resin composition (F4) and Resin composition (F1) were kneaded by a biaxial extruder in a proportion of 62.5/37.5 (weight ratio) as a former/latter ratio, and the obtained resin composition was used as Resin composition (F3).

Resin Compositions G1 to G2

The following resin compositions (G1 to G2) were prepared by using PBT (a polycondensation product of terephthalic acid and 1,4-butanediol) or an amine-modified PBT (a reaction product of the PBT and hexamethylenediamine) as a thermoplastic resin. A calculation with MOPACPM3 was carried out based upon the following constitutive unit.

for the PBT:

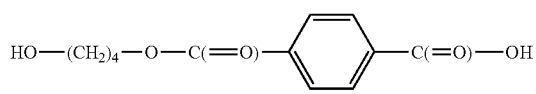

for the amine-modified PBT:

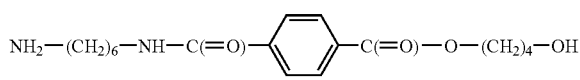

Resin Composition (G1):

A PBT [terminal OH/terminal COOH=1/1 (molar ratio)]

(Preparation)

To a reactor equipped with a nitrogen-introducing unit and a distilling unit were charged 14.587 kg of dimethyl terephthalate, 6.767 kg of 1,4-butanediol, 30 g of calcium acetate, and 60 g of antimony oxide, and the mixture was heated at 180° C. with supplying nitrogen gas. At the point of confirming an effluent of methanol, the mixture was gradually heated to 270° C. under a reduced pressure with stirring to reach degree of vacuum of not more than 100 Pa. With confirming an effluent of ethylene glycol, the mixture was heated at 270° C. for 3 hours. The resultant was allowed to stand for cooling. The obtained polymer was used for Resin composition (G1).

Resin Composition (G2):

An amine-modified PBT [terminal NH$_2$/terminal OH=1/1 (molar ratio)]

(Preparation)

Resin composition (G2) was obtained by kneading Resin composition (G1) and an equimolar methylenediamine relative to a carboxylic group content of Resin composition (G1) at 230° C. for 30 minutes with use of a kneader.

Resin Compositions H

As Resin composition H, poly(2,5-dimethylphenylene ether) (manufactured by Degussa Co. Ltd., Vestoran 1990) was used. A MOPACPM3 calculation was carried out based upon the following constitutive unit.

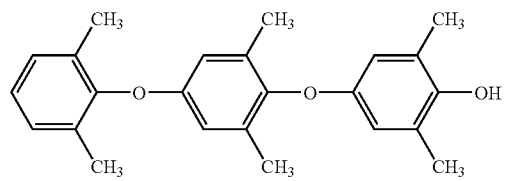

Resin Compositions I

A polypropylene was used as Resin composition I. A MOPACPM3 calculation was conducted for the following constitutive unit.

CH$_3$—CH(CH$_3$)—CH$_2$—CH(CH$_3$)—CH$_2$—CH
  (CH$_3$)—CH$_2$—CH$_2$(CH$_3$)

Resin Compositions J

A polyacetal (manufactured by Polyplastics Co. Ltd., Juracone M90) was used as Resin composition J. A calculation with MOPACPM3 was carried out for the following basic unit.

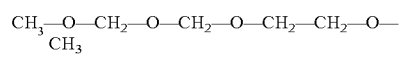

Resin Compositions K

A polyphenylene sulfide [manufactured by Polyplastics Co. Ltd., Fortlon 0220A9 (non-charged)] was used for a resin composition K. The following constitutive unit was bases for calculation of MOPACPM3.

Resin compositions (L to N) were prepared by mixing or compounding a resin and a vulcanization-activating agent in a suitable ratio.

Resin Compositions L1 to L2

Resin Composition (L1):

(i) 100 parts by weight of a polyamide 612 [terminal NH$_2$/terminal COOH=1/1 (molar ratio)] and (ii) 3 parts by weight of a vulcanization-activating agent (trimethylolpropane trimethacrylate)

Resin Composition (L2):

(i) 100 parts by weight of a polyamide 612 [terminal NH$_2$/terminal COOH=1/9 (molar ratio)] and (ii) 3 parts by weight of a vulcanization-activating agent (trimethylolpropane trimethacrylate)

Resin Compositions M1 to M2

Resin Composition (M1):

(i) 100 parts by weight of a polyamide 6 [terminal NH$_2$/terminal COOH=1/1 (molar ratio)] and (ii) 3 parts by weight of a vulcanization-activating agent (N,N'-1,3-phenylenedimaleimide)

Resin Composition (M2):

(i) 100 parts by weight of a polyamide 6 [terminal NH$_2$/terminal COOH=1/4 (molar ratio)] and (ii) 3 parts by weight of a vulcanization-activating agent (N,N'-1,3-phenylenedimaleimide)

Resin Compositions N1 to N2

The following resin compositions (N1 to N2) were prepared by use of a polycondensation product of dodecanedicarboxylic acid and bis(4-aminocyclohexyl) methane (the above mentioned alicyclic polyamide A6) as a thermoplastic resin.

Resin Composition (N1):

(i) 100 parts by weight of an alicyclic polyamide A6 [terminal NH$_2$/terminal COOH=1/1 (molar ratio)] and (ii) 3 parts by weight of a vulcanization-activating agent (triallyl isocyanurate)

Resin Composition (N2):

(i) 100 parts by weight of an alicyclic polyamide A6 [terminal $NH_2$/terminal COOH=1/2 (molar ratio)] and (ii) 5 parts by weight of a vulcanization-activating agent (triallyl isocyanurate)

Resin Compositions O1 to O2

Resin Composition (O1):

(i) 100 parts by weight of a PBT [terminal OH/terminal COOH=1/1 (molar ratio)] and (ii) 3 parts by weight of a vulcanization-activating agent (trimethylolpropane trimethacrylate)

Resin Composition (O2):

(i) 100 parts by weight of an amine-denatured or modified PBT [terminal $NH_2$/terminal COOH=1/1 (molar ratio)] and (ii) 3 parts by weight of a vulcanization-activating agent (trimethylolpropane trimethacrylate)

[Unvalcanized Rubber Composition (R)]

The following components was mixed or compounded in order to prepare unvalcanized rubber compositions (R1 to R10).

Rubber Composition R1

(i) 100 parts by weight of a rubber [90 parts by weight of an ethylene-propylene-diene rubber (manufactured by DSM Co. Ltd., Keltan 509X100, diene content: 8.2% by weight) and 10 parts by weight of a polyoctenylene rubber (manufactured by Degussa Co. Ltd., Vestenamer 8012)]

(ii) 1 part by weight of a filler [carbon black (FEF)]

(iii) 5 parts by weight of a radical-generating agent [organic peroxide (dicumyl peroxide)]

(iv) 0 part by weight of a vulcanization-activating agent (v) 100 parts by weight of a plasticizer (manufactured by Idemitsu Kosan Co. Ltd., Diana process oil NM-68)

(vi) 5 parts by weight of zinc oxide and (vii) 1 part by weight of stearic acid

Rubber Composition R2

(i) 100 parts by weight of a rubber [90 parts by weight of an ethylene-propylene-diene rubber (manufactured by DSM Co. Ltd., Keltan 509X100, diene content: 8.2% by weight) and 10 parts by weight of a polyoctenylene rubber (manufactured by Degussa Co. Ltd., Vestenamer 8012)]

(ii) 1 part by weight of a filler [carbon black (FEF)]

(iii) 5 parts by weight of a radical-generating agent [organic peroxide (dicumyl peroxide)]

(iv) 1 part by weight of a vulcanization-activating agent (trimethylolpropane trimethacrylate)

(v) 100 parts by weight of a plasticizer (manufactured by Idemitsu Kosan Co. Ltd., Diana process oil NM-68)

(vi) 5 parts by weight of zinc oxide and (vii) 1 part by weight of stearic acid

Rubber Composition R3

(i) 100 parts by weight of a rubber [90 parts by weight of an ethylene-propylene-diene rubber (manufactured by DSM Co. Ltd., Keltan 509×100, diene content: 8.2% by weight) and 10 parts by weight of a polyoctenylene rubber (manufactured by Degussa Co. Ltd., Vestenamer 8012)]

(ii) 1 part by weight of a filler [carbon black (FEF)]

(iii) 5 parts by weight of a radical-generating agent [organic peroxide (dicumyl peroxide)]

(iv) 2 parts by weight of a vulcanization-activating agent (butanediol dimethacrylate)

(v) 100 parts by weight of a plasticizer (manufactured by Idemitsu Kosan Co. Ltd., Diana process oil NM-68)

(vi) 5 parts by weight of zinc oxide and (vii) 1 part by weight of stearic acid

Rubber Composition R4

(i) 100 parts by weight of a rubber [90 parts by weight of an ethylene-propylene-diene rubber (manufactured by DSM Co. Ltd., Keltan 509X100, diene content: 8.2% by weight) and 10 parts by weight of a polyoctenylene rubber (manufactured by Degussa Co. Ltd., Vestenamer 8012)]

(ii) 1 part by weight of a filler [carbon black (FEF)]

(iii) 3 parts by weight of a radical-generating agent (tetramethylthiuram disulfide)

(iv) 1 part by weight of a vulcanization-activating agent (trimethylolpropane trimethacrylate)

(v) 100 parts by weight of a plasticizer (manufactured by Idemitsu Kosan Co. Ltd., Diana process oil NM-68)

(vi) 5 parts by weight of zinc oxide and (vii) 1 part by weight of stearic acid

Rubber Composition R5

(i) 100 parts by weight of a rubber [60 parts by weight of natural rubber, 35 parts by weight of ethylene-propylene-diene rubber (manufactured by DSM Co. Ltd., Keltan 509X100, diene content: 8.2% by weight), and 5 parts by weight of polyoctenylene rubber (manufactured by Degussa Co. Ltd., Vestenamer 8012)]

(ii) 1 part by weight of a filler [carbon black (FEF)]

(iii) 5 parts by weight of a radical-generating agent [organic peroxide (dicumyl peroxide)]

(iv) 0 part by weight of a vulcanization-activating agent (v) 100 parts by weight of a plasticizer (manufactured by Idemitsu Kosan Co. Ltd., Diana process oil NM-68)

(vi) 5 parts by weight of zinc oxide and (vii) 1 part by weight of stearic acid

Rubber Composition R6

(i) 100 parts by weight of a rubber [60 parts by weight of natural rubber, 35 parts by weight of ethylene-propylene-diene rubber (manufactured by DSM Co. Ltd., Keltan 509X100, diene content: 8.2% by weight), and 5 parts by weight of polyoctenylene rubber (manufactured by Degussa Co. Ltd., Vestenamer 8012)]

(ii) 1 part by weight of a filler [carbon black (FEF)]

(iii) 5 parts by weight of a radical-generating agent [organic peroxide (dicumyl peroxide)]

(iv) 1 part by weight of a vulcanization-activating agent (trimethylolpropane trimethacrylate)

(v) a plasticizer (manufactured by Idemitsu Kosan Co. Ltd., Diana process oil NM-68) of 100 parts by weight (vi) zinc oxide of 5 parts by weight (vii) stearic acid of 1 part by weight Rubber Composition R7

(i) 100 parts by weight of a hydrogenated nitrile rubber (HNBR) ("Zetpol 3110" manufactured by Nihon Zeon Co. Ltd.)

(ii) 50 parts by weight of a filler [carbon black (N550)]

(iii) 3 parts by weight of a radical-generating agent [1,3-bis(t-butylperoxyisopropyl)benzene]

(iv) 0 part by weight of a vulcanization-activating agent (v) 10 parts by weight of a plasticizer (dibutylmethylene bisthioglycolate)

(vi) 0 part by weight of zinc oxide and (vii) 0 part by weight of stearic acid

Rubber Composition R8

(i) 100 parts by weight of a hydrogenated nitrile rubber (HNBR) ("Zetpol 3110" manufactured by Nihon Zeon Co. Ltd.)

(ii) 50 parts by weight of a filler [carbon black (N550)]

(iii) 3 parts by weight of a radical-generating agent [1,3-bis(t-butylperoxyisopropyl)benzene]

(iv) 4 parts by weight of a vulcanization-activating agent (N,N'-1,3-phenylenedimaleimide)

(v) 10 parts by weight of a plasticizer (dibutylmethylene bisthioglycolate)

(vi) 0 part by weight of zinc oxide and (vii) 0 part by weight of stearic acid

Rubber Composition R9
(i) 100 parts by weight of a fluorine-containing rubber (FPM) ("Dai El G920" manufactured by Dikin Kogyo Co. Ltd.)
(ii) 0 part by weight of a filler
(iii) 3 parts by weight of a radical-generating agent (dicumyl peroxide)
(iv) 0 part by weight of a vulcanization-activating agent
(v) 0 part by weight of a plasticizer (manufactured by Idemitsu Kosan Co. Ltd., Diana process oil NM-68)
(vi) 0 part by weight of zinc oxide and
(vii) 0 part by weight of stearic acid Rubber Composition R10
(i) 100 parts by weight of a fluorine-containing rubber (FPM) ("Dai El G920" manufactured by Dikin Kogyo Co. Ltd.)
(ii) 0 part by weight of a filler
(iii) 3 parts by weight of a radical-generating agent (dicumyl peroxide)
(iv) 4 parts by weight of a vulcanization-activating agent (triallyl isocyanurate)
(v) 0 part by weight of a plasticizer (manufactured by Idemitsu Kosan Co. Ltd., Diana process oil NM-68)
(vi) 0 part by weight of a zinc oxide and
(vii) 0 part by weight of a stearic acid Examples 1 to 147 and Comparative Examples 1 to 77

The resin composition was injected and molded, and the obtained resin member (plate, size: 100 mm×100 mm×4 mm) was arranged in a mold. Subsequently, the unvulcaniezed rubber composition was injected to the surface of the resin member, and vulcanization or crosslinking was conducted at a temperature of 180° C. under a pressure of 20 MPa for 20 minutes to produce a composite.

The obtained composite was subjected to a peeling or adhesion test in order to measure a adhesive strength between the resin member and a rubber member, and was evaluated according to the following criteria.

A: Remarkably film adhesion was achieved, and when the resin member was peeled from the rubber member forcibly, the specimen was broken with a cohesive failure.

B: Firm adhesion was achieved, and when the resin member was peeled from the rubber member forcibly, the resin member was peeled from the rubber member along the interface.

C: The rubber member was easily separated from the resin member along the interface.

The results are set forth in Tables 1 to 10. In the Tables, the term "the number of active atom per molecule" represents the number of an active atom having S of not less than 0.006 per molecule, which is calculated by MOPACPM3, of the thermoplastic resin. Incidentally, on the above calculation, Ec value was used −8 eV for a radical-generating agent comprising an organic peroxide, or −6 eV for a radical-generating agent comprising tetramethylthiuram disulfide.

TABLE 1

Rubber composition R1

| | thermoplastic resin composition | number of active atom per molecule | adhesive strength |
|---|---|---|---|
| Example 1 | A1 | 7.2 | A |
| Example 2 | A2 | 7.2 | A |
| Example 3 | A3 | 7.2 | A |
| Example 4 | A4 | 4 | A |

TABLE 1-continued

Rubber composition R1

| | thermoplastic resin composition | number of active atom per molecule | adhesive strength |
|---|---|---|---|
| Example 5 | A5 | 2.4 | B |
| Comparative example 1 | A6 | 0.8 | C |
| Example 6 | B1 | 2 | B |
| Comparative example 2 | B2 | 1 | C |
| Example 7 | C1 | 7.2 | A |
| Example 8 | C2 | 2 | B |
| Comparative example 3 | C3 | 1.6 | C |
| Example 9 | D1 | 4 | B |
| Example 10 | D2 | 2 | B |
| Comparative example 4 | D3 | 1.6 | C |
| Example 11 | E1 | 5 or more | B |
| Example 12 | E2 | 4 or more | B |
| Example 13 | E3 | 3.8 or more | B |
| Example 14 | F1 | 3 | A |
| Example 15 | F2 | 2 | B |
| Comparative example 5 | F3 | 1.2 | C |
| Comparative example 6 | G1 | 0 | C |
| Example 16 | G2 | 4 | A |
| Example 17 | H | 6 or more | B |
| Example 18 | I | 9 or more | B |
| Example 19 | J | 6 or more | B |
| Example 20 | K | 2 or more | B |
| Example 21 | L1 | 4 | A |
| Comparative example 7 | L2 | 0.8 | C |
| Example 22 | M1 | 7.2 | A |
| Comparative example 8 | M2 | 1.6 | C |
| Example 23 | N1 | 3 | B |
| Comparative example 9 | O1 | 0 | C |
| Example 24 | O2 | 4 | A |

TABLE 2

Rubber composition R2

| | thermoplastic resin composition | number of active atom per molecule | adhesive strength |
|---|---|---|---|
| Example 25 | A1 | 7.2 | A |
| Example 26 | A2 | 7.2 | A |
| Example 27 | A3 | 7.2 | A |
| Example 28 | A4 | 4 | A |
| Example 29 | A5 | 2.4 | A |
| Comparative example 10 | A6 | 0.8 | C |
| Example 30 | B1 | 2 | A |
| Comparative example 11 | B2 | 1 | C |
| Example 31 | C1 | 7.2 | A |
| Example 32 | C2 | 2 | A |
| Comparative example 12 | C3 | 1.6 | C |
| Example 33 | D1 | 4 | B |
| Example 34 | D2 | 2 | B |
| Comparative example 13 | D3 | 1.6 | C |
| Example 35 | E1 | 5 or more | A |
| Example 36 | E2 | 4 or more | B |
| Example 37 | E3 | 3.8 or more | B |
| Example 38 | F1 | 3 | A |
| Example 39 | F2 | 2 | A |
| Comparative example 14 | F3 | 1.2 | C |
| Comparative example 15 | G1 | 0 | C |
| Example 40 | G2 | 4 | A |
| Example 41 | H | 6 or more | A |
| Example 42 | I | 9 or more | B |
| Example 43 | J | 6 or more | B |
| Example 44 | K | 2 or more | B |
| Example 45 | L1 | 4 | A |
| Comparative example 16 | L2 | 0.8 | C |
| Example 46 | N1 | 3 | A |
| Comparative example 17 | N2 | 1.2 | C |

TABLE 3

Rubber composition R3

| | thermoplastic resin composition | number of active atom per molecule | adhesive strength |
|---|---|---|---|
| Example 47 | A1 | 7.2 | A |
| Example 48 | A2 | 7.2 | A |
| Example 49 | A3 | 7.2 | A |
| Example 50 | A4 | 4 | A |
| Example 51 | A5 | 2.4 | A |
| Comparative example 18 | A6 | 0.8 | C |
| Example 52 | B1 | 2 | B |
| Comparative example 19 | B2 | 1 | C |
| Example 53 | C1 | 7.2 | A |
| Example 54 | C2 | 2 | B |
| Comparative example 20 | C3 | 1.6 | C |
| Example 55 | D1 | 4 | B |
| Example 56 | D2 | 2 | B |
| Comparative example 21 | D3 | 1.6 | C |
| Example 57 | E1 | 5 or more | A |
| Example 58 | E2 | 4 or more | B |
| Example 59 | E3 | 3.8 or more | B |
| Example 60 | F1 | 3 | A |
| Example 61 | F2 | 2 | B |
| Comparative example 22 | F3 | 1.2 | C |
| Comparative example 23 | G1 | 0 | C |
| Example 62 | G2 | 4 | A |
| Example 63 | H | 6 or more | B |
| Example 64 | I | 9 or more | B |
| Example 65 | J | 6 or more | B |
| Example 66 | K | 2 or more | B |

TABLE 4

Rubber composition R4

| | thermoplastic resin composition | number of active atom per molecule | adhesive strength |
|---|---|---|---|
| Comparative example 24 | A1 | 0 | C |
| Comparative example 25 | A2 | 0 | C |
| Comparative example 26 | A3 | 0 | C |
| Comparative example 27 | A4 | 0 | C |
| Comparative example 28 | A5 | 0 | C |
| Comparative example 29 | A6 | 0 | C |
| Comparative example 30 | B1 | 0 | C |
| Comparative example 31 | B2 | 0 | C |
| Example 67 | C1 | 2 | B |
| Comparative example 32 | C2 | 1 | C |
| Comparative example 33 | C3 | 0.8 | C |
| Example 68 | D1 | 4 | B |
| Example 69 | D2 | 2 | B |
| Comparative example 34 | D3 | 1.6 | C |
| Comparative example 35 | E1 | 0 | C |
| Comparative example 36 | E2 | 0 | C |
| Comparative example 37 | E3 | 0 | C |
| Comparative example 38 | F1 | 1 | C |
| Comparative example 39 | F2 | 0.7 | C |
| Comparative example 40 | F3 | 0.4 | C |
| Comparative example 41 | G1 | 0 | C |
| Example 70 | G2 | 2 | B |
| Comparative example 42 | H | 0 | C |
| Example 71 | I | 3 or more | B |
| Example 72 | J | 4 or more | B |
| Example 73 | K | 2 or more | B |

TABLE 5

Rubber composition R5

| | thermoplastic resin composition | number of active atom per molecule | adhesive strength |
|---|---|---|---|
| Example 74 | A5 | 2.4 | B |
| Comparative example 43 | A6 | 0.8 | C |
| Example 75 | F2 | 2 | B |
| Comparative example 44 | F3 | 1.2 | C |
| Example 76 | L1 | 4 | A |
| Comparative example 45 | L2 | 0.8 | C |
| Example 77 | M1 | 7.2 | B |
| Comparative example 46 | M2 | 1.6 | C |
| Example 78 | N1 | 3 | B |
| Comparative example 47 | N2 | 1.2 | C |
| Comparative example 48 | O1 | 0 | C |
| Example 79 | O2 | 4 | A |

TABLE 6

Rubber composition R6

| | thermoplastic resin composition | number of active atom per molecule | adhesive strength |
|---|---|---|---|
| Example 80 | A1 | 7.2 | A |
| Example 81 | A2 | 7.2 | A |
| Example 82 | A3 | 7.2 | A |
| Example 83 | A4 | 4 | A |
| Example 84 | A5 | 2.4 | A |
| Comparative example 49 | A6 | 0.8 | C |
| Example 85 | B1 | 2 | B |
| Comparative example 50 | B2 | 1 | C |
| Example 86 | C1 | 7.2 | A |
| Example 87 | C2 | 2 | B |
| Comparative example 51 | C3 | 1.6 | C |
| Example 88 | D1 | 4 | B |
| Example 89 | D2 | 2 | B |
| Comparative example 52 | D3 | 1.6 | C |
| Example 90 | E1 | 5 or more | B |
| Example 91 | E2 | 4 or more | B |
| Example 92 | E3 | 3.8 or more | B |
| Example 93 | F1 | 3 | A |
| Example 94 | F2 | 2 | B |
| Comparative example 53 | F3 | 1.2 | C |
| Comparative example 54 | G1 | 0 | C |
| Example 95 | G2 | 4 | B |
| Example 96 | H | 6 or more | B |
| Example 97 | I | 9 or more | B |
| Example 98 | J | 6 or more | B |
| Example 99 | K | 2 or more | B |
| Example 100 | L1 | 4 | A |
| Example 101 | N1 | 3 | A |
| Comparative example 55 | N2 | 1.2 | C |

TABLE 7

Rubber composition R7

| | thermoplastic resin composition | number of active atom per molecule | adhesive strength |
|---|---|---|---|
| Example 102 | A5 | 2.4 | B |
| Comparative example 56 | A6 | 0.8 | C |
| Example 103 | F2 | 2 | B |
| Comparative example 57 | F3 | 1.2 | C |
| Example 104 | L1 | 4 | A |
| Comparative example 58 | L2 | 0.8 | C |
| Example 105 | N1 | 3 | A |
| Comparative example 59 | N2 | 1.2 | C |

TABLE 8

Rubber composition R8

| | thermoplastic resin composition | number of active atom per molecule | adhesive strength |
|---|---|---|---|
| Example 106 | A1 | 7.2 | A |
| Example 107 | A4 | 4 | A |
| Example 108 | A5 | 2.4 | A |
| Comparative example 60 | A6 | 0.8 | C |
| Example 109 | B1 | 2 | B |
| Comparative example 61 | B2 | 1 | C |
| Example 110 | C1 | 7.2 | A |
| Example 111 | C2 | 2 | B |
| Comparative example 62 | C3 | 1.6 | C |
| Example 112 | E1 | 5 or more | A |
| Example 113 | E2 | 4 or more | B |
| Example 114 | E3 | 3.8 or more | B |
| Example 115 | F1 | 3 | B |
| Example 116 | F2 | 2 | B |
| Comparative example 63 | F3 | 1.2 | C |
| Comparative example 64 | G1 | 0 | C |
| Example 117 | G2 | 4 | A |
| Example 118 | H | 6 or more | A |
| Example 119 | I | 9 or more | B |
| Example 120 | J | 6 or more | B |
| Example 121 | K | 2 or more | B |
| Example 122 | L1 | 4 | A |
| Comparative example 65 | L2 | 0.8 | C |
| Example 123 | N1 | 3 | A |
| Comparative example 66 | N2 | 1.2 | C |

TABLE 9

Rubber composition R9

| | thermoplastic resin composition | number of active atom per molecule | adhesive strength |
|---|---|---|---|
| Example 124 | A5 | 2.4 | B |
| Comparative example 67 | A6 | 0.8 | C |
| Example 125 | F2 | 2 | B |
| Comparative example 68 | F3 | 1.2 | C |
| Example 126 | L1 | 4 | A |
| Comparative example 69 | L2 | 0.8 | C |
| Example 127 | M1 | 7.2 | A |
| Comparative example 70 | M2 | 1.6 | C |
| Example 128 | N1 | 3 | A |
| Comparative example 71 | N2 | 1.2 | C |
| Comparative example 72 | O1 | 0 | C |
| Example 129 | O2 | 4 | A |

TABLE 10

Rubber composition R10

| | thermoplastic resin composition | number of active atom per molecule | adhesive strength |
|---|---|---|---|
| Example 130 | A1 | 7.2 | A |
| Example 131 | A4 | 4 | B |
| Example 132 | A5 | 2.4 | B |
| Comparative example 73 | A6 | 0.8 | C |
| Example 133 | B1 | 2 | B |
| Comparative example 74 | B2 | 1 | C |
| Example 134 | C1 | 7.2 | B |
| Example 135 | C2 | 2 | B |
| Comparative example 75 | C3 | 1.6 | C |
| Example 136 | E1 | 5 or more | B |
| Example 137 | E2 | 5 or more | B |
| Example 138 | E3 | 3.8 or more | B |
| Example 139 | F1 | 3 | A |
| Example 140 | F2 | 2 | B |
| Comparative example 76 | F3 | 1.2 | C |
| Comparative example 77 | G1 | 0 | C |
| Example 141 | G2 | 4 | B |
| Example 142 | H | 6 or more | A |
| Example 143 | I | 9 or more | B |
| Example 144 | J | 6 or more | B |
| Example 145 | K | 2 or more | B |
| Example 146 | L1 | 4 | A |
| Example 147 | N1 | 3 | A |

As shown in Tables 1 to 10, since resins having the number of an active atom of not less than 2 were used in examples, a firmly bonding between the resin and the rubber can be effected regardless of species of rubbers.

Example 148

An adhesive effect of a solvent treatment was examined in the combination of Rubber composition R1/Resin composition A5 (PA612) having an adhesive strength level "B". That is, a paper ("Kimwipe wiper S-200" manufactured by Cresia, Co. Ltd.) was folded 3 times in a cross or lateral direction and once in a longitudinal direction, and a tip of the folded paper was dipped in a solvent (hexafluoroisopropanol). A bonding surface of a test piece of a resin A5 (PA612) (plate, size: 100 mm×100 mm×4 mm) was slightly wiped with the dipped paper. It was confirmed visually that the surface of the test piece was completely wetted with solvent, and as a result it was evaluated that the surface was wiped down or cleaned. After cleaning the surface, the test piece was allowed to stand for 5 minutes, and washed with water, and subsequently dried at 100° C. for 5 hours in the vacuum dryer to be subjected to an adhesion test. In the same manner as in Example 1, a composite was produced with use of the test piece and an unvulcanized rubber composition. The obtained composite was subjected to an adhesion test in order to evaluate an adhesive strength between the resin member and the rubber member, and the adhesive strength of the composite was improved to a level "A".

Example 149

A composite was produced in the same manner as in Example 148 except for using a methacresol instead of hexafluoroisopropanol. The obtained composite was subjected to an adhesion test in order to measure an adhesive strength between the resin member and the rubber member, and the adhesive strength of the composite was improved to a level "A".

Example 150

In a composite of Rubber composition R1/Resin composition H (m-PPE) having the adhesive strength level "B", the procedure was repeated in the same manner as in Example 148 except for wiping a bonding surface of the test piece of the Resin composition H (m-PPE) (plate, size: 100 mm×100 mm×4 mm) with a methacresol-impregnated paper to give a composite. The obtained composite was subjected to an adhesion test in order to measure an adhesive strength between the resin member and the rubber member, and the adhesive strength of the composite was enhanced to be a level "A".

The invention claimed is:

1. A composite comprising a vulcanized rubber member formed by a vulcanization of a non-silicone-series unvulcanized rubber, and a resin member comprising a thermoplastic resin and directly bonded to the rubber member, which comprises a combination of a rubber member vulcanized with a radical-generating agent other than sulfur and a resin member comprising a thermoplastic resin having at least 2 atoms, on average, selected from a hydrogen atom and a sulfur atom per molecule, and each atom has an orbital interaction energy coefficient S of not less than 0.006, wherein (i) the orbital interaction energy coefficient S is represented by the following formula (1):

$$S = \sum_n |(C_{HOMO,n})^2/|E_c - E_{HOMO,n}| + (C_{LUMO,n})^2/|E_c - E_{LUMO,n}|| \quad (1)$$

wherein each of $E_c$, $C_{HOMO,n}$, $E_{HOMO,n}$, $C_{LUMO,n}$, and $E_{LUMO,n}$ represents a value calculated by a semi-empirical molecular orbital method MOPACPM3, $E_c$ representing an orbital energy (eV) of a radical of the radical-generating agent, $C_{HOMO,n}$ representing a molecular-orbital coefficient of a highest occupied molecular orbital (HOMO) of an n-th hydrogen or sulfur atom constituting a constitutive unit of the thermoplastic resin, $E_{HOMO,n}$ representing an orbital energy (eV) of the HOMO, $C_{LUMO,n}$ representing a molecular-orbital coefficient of a lowest unoccupied molecular orbital (LUMO) of the n-th hydrogen or sulfur atom constituting the constitutive unit of the thermoplastic resin, and $E_{LUMO,n}$ representing an orbital energy (eV) of the LUMO;

(ii) the thermoplastic resin consists of at least one member selected from the group consisting of a polyamide-series resin, a polyester-series resin, a polyether-series resin, a polyolefinic resin, a polyurethane-series resin, and a polyamide-series elastomer;

(iii) the radical-generating agent comprises an organic peroxide, and the radical-generating agent is present in an amount of 1 to 10 parts by weight relative to 100 parts by weight of the unvulcanized rubber; and (iv) at least one component selected from the unvulcanized rubber and the thermoplastic resin comprises a vulcanization-activating agent which comprises an organic compound having at least two polymerizable unsaturated bonds per molecule, and the vulcanization-activating agent is present in an amount of 0.1 to 10 parts by weight relative to 100 parts by weight of at least one component selected from the unvulcanized rubber and the thermoplastic resin, provided that said combination excludes the following combinations (1) to (3):

(1) a combination of an aliphatic polyamide-series resin having an amino group and an unvulcanized rubber having a carboxyl group or an acid anhydride group, (2) a combination of an aliphatic polyamide-series resin and an unvulcanized rubber comprising a silane compound, (3) a combination of an epoxy group-containing resin and an unvulcanized rubber having a carboxyl group or an acid anhydride group; and provided that said combination includes the following cases (4) to (7):

(4) when the unvulcanized rubber comprises the vulcanization-activating agent, the vulcanization-activating agent is at least one polyfunctional vulcanization-activating agent selected from the group consisting of divinylbenzene, a diallyl phthalate, a triallyl phosphate, a triallyl (iso)cyanurate, a maleimide-series compound, a $C_{2-10}$alkylene glycol di(meth)acrylate, a poly$C_{2-4}$alkylene glycol di(meth)acrylate, glycerol di(meth)acrylate, trimethylolpropane di(meth)acrylate, pentaerythritol di(meth)acrylate, and a tri- or poly-functional (meth)acrylate, (5) when the thermoplastic resin comprises a polyamide-series resin, an unvulcanized rubber comprises at least one polyfunctional vulcanization-activating agent selected from the group consisting of divinylbenzene, a diallyl phthalate, a triallyl phosphate, a $C_{2-10}$alkylene glycol di(meth)acrylate, a poly$C_{2-4}$alkylene glycol di(meth)acrylate, glycerol di(meth)acrylate, trimethylolpropane di(meth)acrylate, pentaerythritol di(meth)acrylate, and a tri- or poly-functional (meth)acrylate, (6) when the thermoplastic resin comprises a polyphenylene ether-series resin, an unvulcanized rubber comprises at least one member selected from the group consisting of an olefinic rubber, an acrylic rubber, a fluorine-containing rubber, and a urethane-series rubber and comprises a vulcanization-activating agent, and (7) when the thermoplastic resin comprises an aromatic polyester-series resin, the polyester-series resin comprises a polyester-series resin having an amino group.

2. A composite according to claim 1, wherein the thermoplastic resin comprises at least one member selected from the group consisting of an aliphatic polyamide-series resin, an aromatic polyester-series resin, polyether-series resin selected from the group consisting of a polyacetal-series resin, a polyphenylene ether-series resin and a polysulfide-series resin; a polyolefinic resin, a polyurethane-series resin, and a polyamide-series elastomer.

3. A composite according to claim 1, wherein the rubber comprises at least one member selected from the group consisting of a diene-series rubber, an olefinic rubber, an acrylic rubber, a fluorine-containing rubber, and a urethane-series rubber.

4. A composite according to claim 1, wherein the radical-generating agent comprises at least one member selected from the group consisting of an organic peroxide, an azo compound, and a sulfur-containing organic compound.

5. A composite according to claim 1, wherein the amount of the radical-generating agent is 1 to 10 parts by weight relative to 100 parts by weight of the unvulcanized rubber.

6. A composite according to claim 1, wherein the vulcanization-activating agent comprises an organic compound having at least two polymerizable-unsaturated bonds per molecule.

7. A composite according to claim 1, wherein the amount of the vulcanization-activating agent is 0.1 to 10 parts by weight relative to 100 parts by weight of at least one component selected from the unvulcanized rubber and the thermoplastic resin.

8. A composite according to claim 1, wherein said combination is any of the following combinations:

(a) a combination of a polyamide-series resin and an unvulcanized rubber unmodified with a carboxyl group or an acid anhydride group;

(b) a combination of a polyamide-series resin and an unvulcanized rubber comprising an organic peroxide, a polyfunctional vulcanization-activating agent and excluding an alkoxy silane compound;

(c) a combination of an aromatic polyester-series resin having an amino group and an unvulcanized rubber comprising an organic peroxide;

(d) a combination of a polyacetal-series resin and an unvulcanized rubber comprising an organic peroxide;
(e) a combination of a polyphenylene ether-series resin and an unvulcanized rubber comprising an organic peroxide and a vulcanization-activating agent;
(f) a combination of a polysulfide-series resin and an unvulcanized rubber comprising an organic peroxide;
(g) a combination of a polypropylene-series resin and an unvulcanized rubber comprising an organic peroxide;
(h) a combination of a polyurethane-series resin and an unvulcanized rubber comprising an organic peroxide; and
(i) a combination of a polyamide-series elastomer and an unvulcanized rubber comprising an organic peroxide.

9. A composite according to claim 1, wherein the thermoplastic resin comprises a vulcanization-activating agent.

10. A composite comprising a vulcanized rubber member formed by a vulcanization of a non-silicone-series unvulcanized rubber, and a resin member comprising a thermoplastic resin and directly bonded to the rubber member, which comprises a combination of a rubber member vulcanized with a radical-generating agent other than sulfur and a resin member comprising a thermoplastic resin having at least 2 atoms, on average, selected from a hydrogen atom and a sulfur atom per molecule, and each atom has an orbital interaction energy coefficient S of not less than 0.006,
wherein
(i) the orbital interaction energy coefficient S is represented by the following formula (1):

$$S=(C_{HOMO,n})^2/|E_c-E_{HOMO,n}|+(C_{LUMO,n})^2/|E_c-E_{LUMO,n}| \quad (1)$$

wherein each of $E_c$, $C_{HOMO,n}$, $E_{HOMO,n}$, $C_{LUMO,n}$, and $E_{LUMO,n}$ represents a value calculated by a semi-empirical molecular orbital method MOPACPM3, $E_c$ representing an orbital energy (eV) of a radical of the radical-generating agent, $C_{HOMO,n}$ representing a molecular-orbital coefficient of a highest occupied molecular orbital (HOMO) of an n-th hydrogen or sulfur atom constituting a constitutive unit of the thermoplastic resin, $E_{HOMO,n}$ representing an orbital energy (eV) of the HOMO, $C_{LUMO,n}$ representing a molecular-orbital coefficient of a lowest unoccupied molecular orbital (LUMO) of the n-th hydrogen or sulfur atom constituting the constitutive unit of the thermoplastic resin, and $E_{LUMO,n}$ representing an orbital energy (eV) of the LUMO;
(ii) the thermoplastic resin consists of at least one member selected from the group consisting of a polyamide-series resin, a polyester-series resin, a polyether-series resin, a polyolefinic resin, a polyurethane-series resin, and a polyamide-series elastomer;
(iii) the radical-generating agent comprises an organic peroxide, and the radical-generating agent is present in an amount of 1 to 10 parts by weight relative to 100 parts by weight of the unvulcanized rubber; and
(iv) at least one component selected from the unvulcanized rubber and the thermoplastic resin comprises a vulcanization-activating agent which comprises an organic compound having at least two polymerizable unsaturated bonds per molecule, and the vulcanization-activating agent is present in an amount of 0.1 to 10 parts by weight relative to 100 parts by weight of at least one component selected from the unvulcanized rubber and the thermoplastic resin,
(v) the rubber consists of at least one member selected from the group consisting of a natural rubber, an isoprene rubber, an isobutylene-isoprene rubber, a butadiene rubber, a chloroprene rubber, a styrene-butadiene rubber, a styrene-chloroprene rubber, a styrene-isoprene rubber, an olefinic rubber, an acrylic rubber, a fluorine-containing rubber, and a urethane-series rubber,
provided that said combination excludes the following combinations (1) to (3):
(1) a combination of an aliphatic polyamide-series resin having an amino group and an unvulcanized rubber having a carboxyl group or an acid anhydride group,
(2) a combination of an aliphatic polyamide-series resin and an unvulcanized rubber comprising a silane compound,
(3) a combination of an epoxy group-containing resin and an unvulcanized rubber having a carboxyl group or an acid anhydride group; and
provided that said combination includes the following cases (4) to (7):
(4) when the unvulcanized rubber comprises the vulcanization-activating agent, the vulcanization-activating agent is at least one polyfunctional vulcanization-activating agent selected from the group consisting of divinylbenzene, a diallyl phthalate, a triallyl phosphate, a triallyl (iso)cyanurate, a maleimide-series compound, a $C_{2-10}$alkylene glycol di(meth)acrylate, a poly$C_{2-4}$alkylene glycol di(meth)acrylate, glycerol di(meth)acrylate, trimethylolpropane di(meth)acrylate, pentaerythritol di(meth)acrylate, and a tri- or poly-functional (meth)acrylate,
(5) when the thermoplastic resin comprises a polyamide-series resin, an unvulcanized rubber comprises at least one polyfunctional vulcanization-activating agent selected from the group consisting of divinylbenzene, a diallyl phthalate, a triallyl phosphate, a $C_{2-10}$alkylene glycol di(meth)acrylate, a poly$C_{2-4}$alkylene glycol di(meth)acrylate, glycerol di(meth)acrylate, trimethylolpropane di(meth)acrylate, pentaerythritol di(meth)acrylate, and a tri- or poly-functional (meth)acrylate,
(6) when the thermoplastic resin comprises a polyphenylene ether-series resin, an unvulcanized rubber comprises at least one member selected from the group consisting of an olefinic rubber, an acrylic rubber, a fluorine-containing rubber, and a urethane-series rubber and comprises a vulcanization-activating agent, and
(7) when the thermoplastic resin comprises an aromatic polyester-series resin, the polyester-series resin comprises a polyester-series resin having an amino group.

* * * * *